United States Patent
Loftin et al.

(10) Patent No.: US 12,387,180 B2
(45) Date of Patent: Aug. 12, 2025

(54) APPLICATION TO NOTIFY VEHICLE OWNER OF UNDESIRABLE VEHICLE CONDITION

(71) Applicant: SMOOTHER ROADS AHEAD LLC, La Mesa, CA (US)

(72) Inventors: Thomas Loftin, Alpine, CA (US); Charles Marchesini, La Mesa, CA (US)

(73) Assignee: SMOOTHER ROADS AHEAD LLC, La Mesa, CA (US)

( * ) Notice: Subject to any disclaimer, the term of this patent is extended or adjusted under 35 U.S.C. 154(b) by 22 days.

(21) Appl. No.: 17/949,411

(22) Filed: Sep. 21, 2022

(65) Prior Publication Data
US 2023/0169472 A1    Jun. 1, 2023

Related U.S. Application Data

(60) Provisional application No. 63/246,435, filed on Sep. 21, 2021.

(51) Int. Cl.
*G06Q 30/00* (2023.01)
*G06Q 10/20* (2023.01)

(52) U.S. Cl.
CPC .................................. *G06Q 10/20* (2013.01)

(58) Field of Classification Search
None
See application file for complete search history.

(56) References Cited

U.S. PATENT DOCUMENTS

| | | | | |
|---|---|---|---|---|
| 2009/0119599 A1* | 5/2009 | Hazen | ................... | G06Q 30/02 |
| | | | | 715/738 |
| 2012/0089675 A1* | 4/2012 | Thrower, III | ......... | H04L 51/046 |
| | | | | 709/204 |

(Continued)

FOREIGN PATENT DOCUMENTS

| | | | | |
|---|---|---|---|---|
| WO | WO-2015173826 A1 * | 11/2015 | ............. | G06F 17/00 |
| WO | WO-2020154589 A1 * | 7/2020 | ..... | G06Q 10/063114 |

OTHER PUBLICATIONS

Park, Sangkuen, et al. "Facilitating Pervasive Community Policing on the Road with Mobile Roadwatch." Collaborative Crowdwork, CHI 2017, Ma6-11, 2017, Denver Colorado. (Year: 2017).*

(Continued)

*Primary Examiner* — Luis A Brown
(74) *Attorney, Agent, or Firm* — TROUTMAN PEPPER LOCKE LLP

(57) ABSTRACT

A user of a software application presented herein can notify other registered users of the software application of undesirable conditions of a vehicle associated with a user account. A first user observes a vehicle in an undesirable state (as specified in each of the respective figures). Using the software application, the first user enters a license plate number (or other identification) of the vehicle. The software application determines that the vehicle's license plate number is associated with a user account of a second user. The first user can then navigate a graphical user interface to send a message to the second user related to the vehicle condition. A service provider system can be configured to manage user accounts, direct messages between users, and/or provide other services related to the software application.

18 Claims, 42 Drawing Sheets

(56) References Cited

U.S. PATENT DOCUMENTS

| | | | | |
|---|---|---|---|---|
| 2013/0342337 | A1* | 12/2013 | Kiefer | B60W 50/16 |
| | | | | 340/438 |
| 2015/0127730 | A1* | 5/2015 | Aviv | H04L 51/58 |
| | | | | 709/204 |
| 2016/0129883 | A1* | 5/2016 | Penilla | B60R 25/305 |
| | | | | 348/148 |
| 2016/0214535 | A1* | 7/2016 | Penilla | B60L 53/68 |
| 2016/0366086 | A1* | 12/2016 | Solomon | H04W 4/029 |
| 2020/0139929 | A1* | 5/2020 | Turley | G01S 19/16 |
| 2020/0242855 | A1* | 7/2020 | Sandu | G16Y 40/10 |
| 2021/0019759 | A1* | 1/2021 | Pede | G06Q 30/018 |
| 2021/0241438 | A1* | 8/2021 | Megherby | B25J 19/023 |
| 2022/0303877 | A1* | 9/2022 | Choi | H04W 4/80 |
| 2023/0169472 | A1* | 6/2023 | Loftin | G06Q 10/20 |
| | | | | 705/305 |

OTHER PUBLICATIONS

Gerla, Mario, et al. "Vehicular Networks and the Future of Mobile Internet." Computer Networks, vol. 55, pp. 457-469, 2011. (Year: 2011).*

* cited by examiner

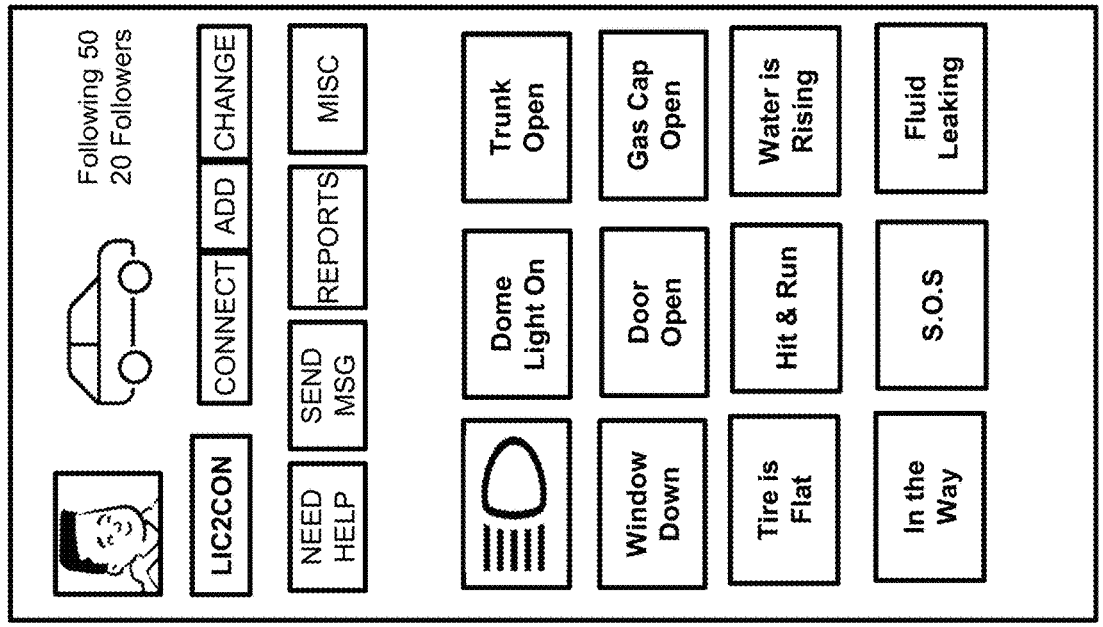
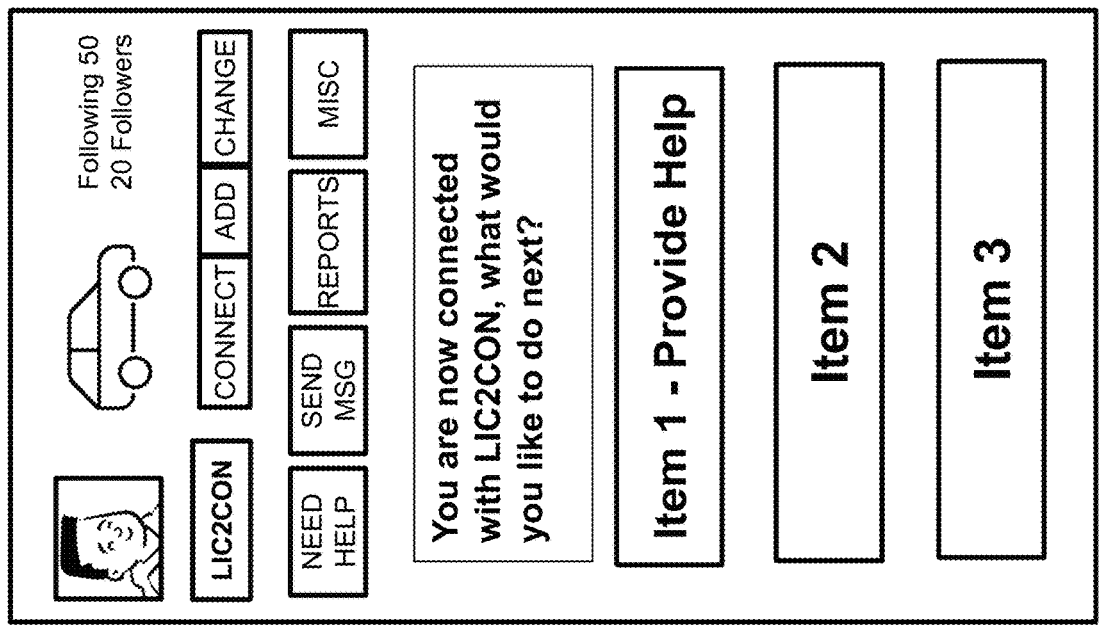

APPLICATION TO NOTIFY VEHICLE OWNER OF UNDESIRABLE VEHICLE CONDITION

CROSS REFERENCE TO RELATED APPLICATIONS

The present application claims priority to U.S. Provisional Patent Application 63/246,435 filed Sep. 21, 2021, the entire contents of which is incorporated herein by reference.

FIELD

The present invention generally relates systems, devices, and methods for a computing device application directed toward vehicular safety.

BACKGROUND

There exists a need for citizens to notify vehicle owners of undesirable vehicle conditions.

SUMMARY

A user of a software application presented herein can notify other registered users of the software application of undesirable conditions of a vehicle associated with a user account. A first user observes a vehicle in an undesirable state (as specified in each of the respective figures). Using the software application, the first user enters a license plate number (or other identification) of the vehicle. The software application determines that the vehicle's license plate number is associated with a user account of a second user. The first user can then navigate a graphical user interface to send a message to the second user related to the vehicle condition. A service provider system can be configured to manage user accounts, direct messages between users, and/or provide other services related to the software application.

In one example, non-transitory computer-readable medium can be configured to communicate with one or more processor(s) of a computing device. The non-transitory computer-readable medium can include instructions thereon, that when executed by the processor(s), cause the computing device to: store a vehicle identification in a user profile such that the vehicle identification identifies a vehicle of a user of the user profile; and receive a notification related to the vehicle from a third party computing device.

The user profile can be anonymous to the third party computing device.

The non-transitory computer-readable medium can further include instructions, that when executed by the processor, cause the computing device to: store a plurality of vehicle identifications in the user profile such that each vehicle identification of the plurality of vehicle identifications identifies a respective vehicle; receive a vehicle selection indicating a selected vehicle of the plurality of vehicles; and receive a notification related to the selected vehicle from a third party computing device.

The user profile can be in a closed group of user profiles. The closed group of user profiles can include at least one of: profiles registered by a homeowner's association, profiles registered by a corporate vehicle fleet, profiles registered by a police department, or profiles registered by a vehicle safety organization.

The non-transitory computer-readable medium can further include instructions, that when executed by the processor, cause the computing device to: register a temporary user with a closed group of user profiles such that the temporary user profile is time-limited and stores a temporary vehicle identification, the temporary user profile being distinct from the user profile, and the temporary vehicle identification being distinct from the vehicle identification stored in the user profile. The user profile can be registered with the closed group of user profiles.

The closed group of user profiles can be managed by profile management system configured for use by a homeowner's association, a corporate vehicle fleet, a police department, or a vehicle safety organization.

The non-transitory computer-readable medium can further include instructions, that when executed by the processor, cause the computing device to create a secondary driver user profile being distinct from the user profile and storing the vehicle identification of the user profile.

The notification can indicate an undesirable vehicle condition. The notification can indicate at least one selection, at the third party computing device, of a plurality of predetermined undesirable vehicle conditions. The undesirable vehicle condition can include at least one of: headlamp illumination, dome light on, trunk open, window down, door open, gas cap open, tire is flat, hit and run, water is rising, in the way, S.O.S., or fluid leaking.

The non-transitory computer-readable medium can further include instructions, that when executed by the processor, cause the computing device to: provide a user interface configured to allow entry of a third party vehicle identification not stored in the user profile, the third party vehicle identification identifying a third party vehicle; and transmit a notification related to the third party vehicle to a third party user profile storing the third party vehicle identification.

The non-transitory computer-readable medium can further include instructions, that when executed by the processor, cause the computing device to: provide a plurality of predetermined selections to the user; and receive one or more of the plurality of predetermined selections from the user. The notification related to the third party vehicle can be based at least in part on the one or more of the plurality of predetermined selections received from the user.

The third party user profile can be anonymous to the user profile.

In another example, non-transitory computer-readable medium can be configured to communicate with one or more processor(s) of a computing device, the non-transitory computer-readable medium including instructions thereon, that when executed by the processor(s), cause the computing device to: enter a vehicle identification; provide an indication that the vehicle identification is stored in a third party user profile; and transmit a notification related to a third party vehicle identified by the vehicle identification to the third party user profile.

The third party user profile can be anonymous to the computing device.

The non-transitory computer-readable medium can further include instructions, that when executed by the processor, cause the computing device to store a user's vehicle identification in a user profile such that the user's vehicle identification identifies a vehicle of the user of the user profile.

An example vehicle condition notification service provider system can include a transmitter, a receiver, a processor, and non-transitory computer-readable medium with instructions thereon, that when executed by the processor, cause the vehicle condition notification service provider system to receive a vehicle identification from a first user device, via the receiver, identify a second user profile based at least in part on the vehicle identification, receive one or more predetermined selections related to vehicle condition from the first user device, via the receiver, and transmit a vehicle condition message to a second user device associated with the second user profile, via the transmitter, wherein the vehicle condition message is based at least in part on the one or more predetermined selections.

The one or more predetermined selections can relate to vehicle occupancy.

The one or more predetermined selections can relate to at least one of: headlamp illumination, dome light on, trunk open, window down, door open, gas cap open, tire is flat, hit and run, water is rising, in the way, S.O.S., or fluid leaking.

The non-transitory computer-readable medium can further include instructions thereon, that when executed by the processor, cause the vehicle condition notification service provider system to determine likelihood that the second user device is configured to receive real-time alerts and provide an indication to the first user device of the likelihood that the second user device is configured to receive real time alerts.

A first user profile can be associated with transmitting the vehicle identification and the one or more predetermined selections received from the first user device. The first user profile and the second user profile can be in a closed group of user profiles.

The closed group of user profiles can include at least one of: profiles registered by a homeowner's association, profiles registered by a corporate vehicle fleet, profiles registered by a police department, or profiles registered by a vehicle safety organization.

The vehicle identification includes at least one of: a license plate number, a vehicle identification number (VIN), a quick response (QR) code, or a radio frequency identification (RFID).

The non-transitory computer-readable medium can further include instructions thereon, that when executed by the processor, cause the vehicle condition notification service provider system to register a temporary user.

The non-transitory computer-readable medium can further include instructions, that when executed by the processor, cause the vehicle condition notification service provider system to store multiple vehicles associated with a given user profile.

In another example, non-transitory computer-readable medium can be to communicate with one or more processor(s) of a first user device. The non-transitory computer-readable medium can include instructions thereon, that when executed by the processor(s), cause the first user device to: receive, via a graphical user interface of the first user device, a vehicle identification provided by a first user; display, on the graphical user interface, predetermined selections related to a vehicle condition; receive, via the graphical user interface, one or more of the predetermined selections; and transmit information based at least in part on the one or more predetermined selections, to cause a second user device comprising a second user profile associated with the vehicle identification to receive a vehicle alert message.

The one or more predetermined selections can relate to vehicle occupancy.

The one or more predetermined selections can relate to at least one of: headlamp illumination, dome light on, trunk open, window down, door open, gas cap open, tire is flat, hit and run, water is rising, in the way, S.O.S., or fluid leaking.

The second user profile can be anonymous to the first user device.

The non-transitory computer-readable medium of the first user device can further include instructions, that when executed by the processor, cause the first user device to provide a user query, via the graphical user interface, as to whether or not a vehicle associated with the vehicle identification is occupied; based at least in part on a response to the user query, provide a plurality of selectable vehicle issues; receive a selection of one of the plurality of selectable vehicle issues via the graphical user interface; display, on the graphical user interface, at least one selectable message based at least upon the selection of one of the plurality of selectable vehicle issues; receive a selection of an alert message from the at least one selectable message via interaction the graphical user interface; and transmit the alert message of the at least one selectable messages from the first user device to the second user device.

The non-transitory computer-readable medium of the first device can be integral to a smartphone.

The non-transitory computer-readable medium of the first device can be integral to a vehicle.

In another example, non-transitory computer-readable medium of a second user device can be configured to communicate with one or more processor(s) of the second user device, the non-transitory computer-readable medium including instructions thereon, that when executed by the processor(s), cause the second user device to: store a user profile comprising a vehicle identification; and receive, from a third party system, an alert message based at least in part on a predetermined selection at the third party system of an undesirable vehicle condition of a vehicle identifiable by the vehicle identification.

The one or more predetermined selections can relate to vehicle occupancy.

The one or more predetermined selections can relate to at least one of: headlamp illumination, dome light on, trunk open, window down, door open, gas cap open, tire is flat, hit and run, water is rising, in the way, S.O.S., or fluid leaking.

The non-transitory computer-readable medium of the second user device can be integral to a smartphone.

An example computing system can include a first user device, a second user device, and a service provider system. The first user device can include a first software application thereon storing a first user profile. The second user device can include a second software application thereon storing a second user profile. The service provider system can be configured to: receive a vehicle identification from a first user device, identify the second user profile as being associated with the vehicle identification, receive one or more predetermined selections related to vehicle condition from the first user device, and transmit a vehicle condition message to the second user device, wherein the vehicle condition message is based at least in part on the one or more predetermined selections.

The computing system can further include a profile management system configured to manage registration of the first user profile and the second user profile with the service provider system. The profile management system can further be configured to receive, from the first user device, via the service provider system, a vehicle condition alert based at least in part on the one or more predetermined selections received by the service provider system from the first user device. The profile management system can be operated by one of: a homeowner's association, a corporate vehicle fleet, a police department, or a vehicle safety organization.

An example method can include steps as recited herein. Steps of the method can be performed in various orders and with interleaving steps as understood by a person skilled in the pertinent art. The method can include: receiving a vehicle identification from a first user device, identifying a second user profile based at least in part on the vehicle identification, receiving one or more predetermined selections related to vehicle condition from the first user device, and transmitting a vehicle condition message to a second user device associated with the second user profile. The vehicle condition message can be based at least in part on the one or more predetermined selections.

Another example method can include steps as recited herein. Steps of the method can be performed in various orders and with interleaving steps as understood by a person skilled in the pertinent art. The method can include: receiving, via a graphical user interface of a user device, a vehicle identification provided by a first user; displaying, on the graphical user interface, predetermined selections related to a vehicle condition; receiving, via the graphical user interface, one or more of the predetermined selections; and transmitting a message, based at least in part on the one or more predetermined selections, to a second user device comprising a user profile associated with the vehicle identification.

An example method can include steps as recited herein. Steps of the method can be performed in various orders and with interleaving steps as understood by a person skilled in the pertinent art. The method can include: providing a user query, via a graphical user interface, as to whether or not a vehicle is occupied; providing, based at least in part on a response to the user query, provide a plurality of selectable vehicle issues; receiving a selection of one of the plurality of selectable vehicle issues via the graphical user interface; displaying, on the graphical user interface, at least one selectable message based at least upon the selection of one of the plurality of selectable vehicle issues; receiving a selection of an alert message from the at least one selectable message via interaction the graphical user interface; and transmitting the alert message of the at least one selectable messages to a third party user device.

An example method can include steps as recited herein. Steps of the method can be performed in various orders and with interleaving steps as understood by a person skilled in the pertinent art. The method can include: storing a user profile comprising a vehicle identification; and receiving, from a third party system, an alert message based at least in part on a predetermined selection at the third party system.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIGS. 1A and 1B are illustrations of a snapshot of a graphical user interface on a user device according to aspects of the present invention.

DETAILED DESCRIPTION

Figure 2:
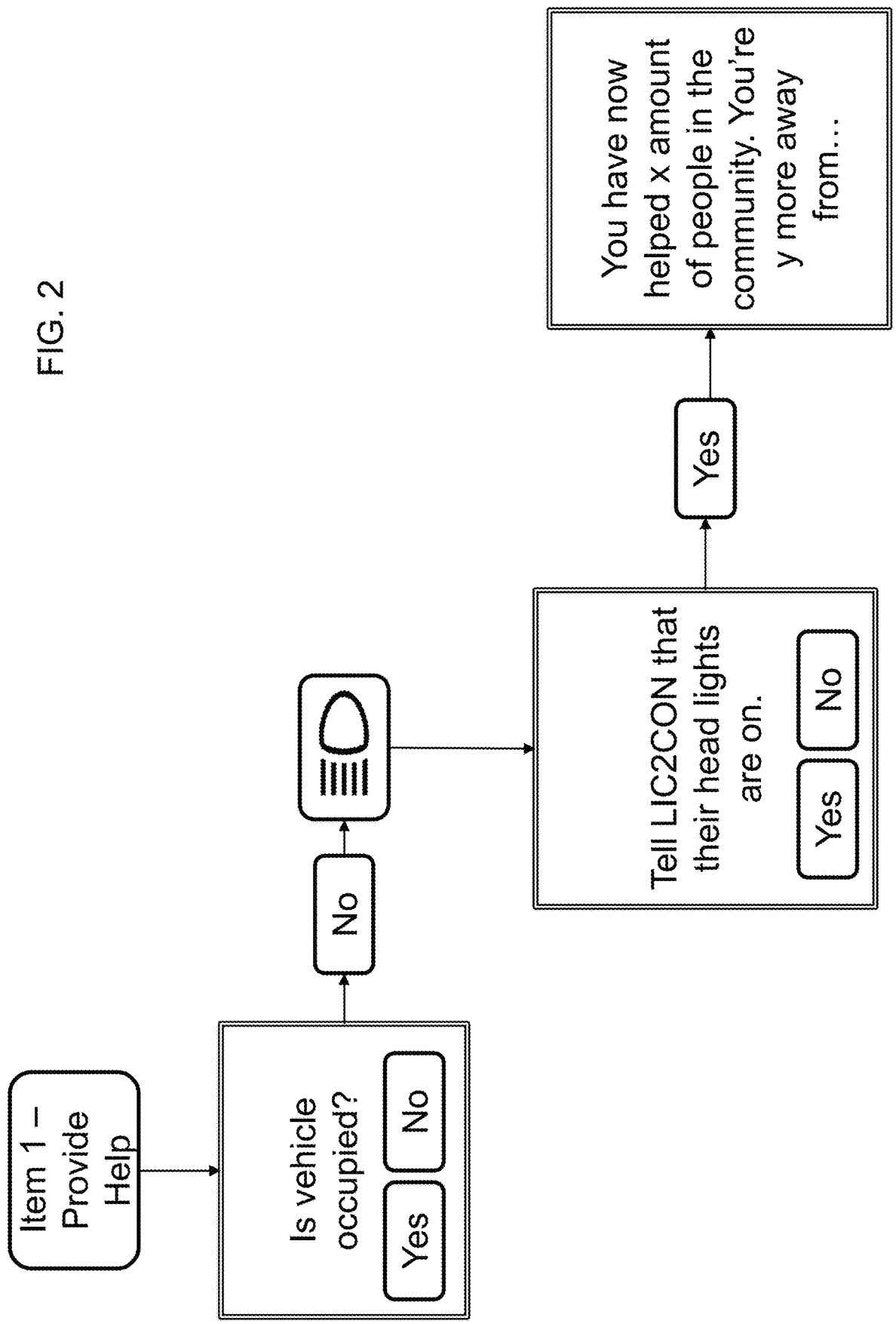
FIGS. 2 through 13 are flow diagrams illustrating interaction with the graphical user interface when providing help to an unoccupied vehicle in various scenarios according to aspects of the present invention.

As used herein, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. Computer readable medium can be non-transitory. Non-transitory computer-readable media include, but are not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable instructions and/or data.

As used herein, the term "computing system" is intended to include stand-alone machines or devices and/or a combination of machines, components, modules, systems, servers, processors, memory, detectors, user interfaces, computing device interfaces, network interfaces, hardware elements, software elements, firmware elements, and other computer-related units. By way of example, but not limitation, a computing system can include one or more of a general-purpose computer, a special-purpose computer, a processor, a portable electronic device, a portable electronic medical instrument, a stationary or semi-stationary electronic medical instrument, or other electronic data processing apparatus.

As used herein, the term "non-transitory computer-readable media" includes, but is not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable information.

As used herein, the term "software application" is used interchangeably with "L2C" and includes computer executable instructions that are configured to cause a computing device to perform various functions.

Aspects of the present invention include communications via a software application to a user associated with a license plate number. A user may create an account via the software application. The account can be managed by a server. The account can include information related to the user and/or the user's vehicle. Preferably, the account includes a vehicle license plate number. The account may alternatively or additionally include a vehicle identification number (VIN). The vehicle identification can be entered by typing and/or by photograph with the user device.

The software application can be configured to allow a first user to alert a second user of an undesirable vehicle condition when a vehicle information (e.g. license plate and/or VIN) is included in an account of the second user. When the first user observes the undesirable vehicle condition, the first user may open the application and enter the vehicle information into a graphical user interface displayed by the software application.

The software application can allow user profiles to be grouped into closed groups. Users may group themselves into closed groups via their user profiles similar to forming groups in social networking applications as understood by a person skilled in the pertinent art. Additionally, or alternatively, groups may be formed and managed by an organization such as a homeowner's association, corporate vehicle fleet, police department, vehicle safety organization, or other such organization as understood by a person skilled in the pertinent art.

The user profile can be configured to register a temporary user with the closed group of user profiles such that the temporary user is registered with the closed group on a time-limited basis. The temporary user can have an existing profile that is temporarily registered to the closed group, or a temporary user profile can be created for the temporary user. For instance, if the closed group includes user profiles of residences of a homeowner's association, a resident having a visitor, maintenance person, or other person bringing a visiting vehicle into the neighborhood, can register a temporary user profile storing a vehicle identification of the visiting vehicle with the closed group. If the visiting vehicle identification is already stored in an existing user profile not registered with the closed group, that existing profile can be registered by the resident, as a temporary user profile to the closed group. If the visiting vehicle identification is not already stored in an existing user profile, the resident can create a temporary user profile storing the visiting vehicle identification.

FIG. 1A is an illustration of a snapshot of a first screen of the graphical user interface which is configured to provide the user with high level options for acting upon the observed undesirable vehicle condition. The first item allows the user to provide help via the software application.

FIG. 1B is an illustration of a snapshot of a second screen of the graphical user interface which appears after the user has selected item 1—provide help, from the first screen. The second screens is configured to allow the user to select from several specific undesirable vehicle conditions related to headlights, interior lights, trunk open, window(s) open, door(s) open, gas cap open, flat tire(s), hit and run, water rising, in the way, S.O.S., and fluid leak. The examples are presented purely for the sake of illustration, and additional vehicle conditions can be displayed and follow the software application can execute to perform tasks corresponding to the additional vehicle conditions similar to as presented herein for the illustrated vehicle conditions.

The screens in FIGS. 1A and 1B include icons and buttons near the top of the screen for accessing other screens (not shown) to input user profile information such as a vehicle identification such as a license plate number of the vehicle, a vehicle identification number (VIN), quick response (QR) code, or radio frequency identification (RFID). As vehicles continue to include computational systems, the vehicle identification can include any number of digital forms of identification including type of identification in which one computing device can identify another computing device e.g. MAC address, IP address, IMEI, IMSI, cookies, host name, and the like as understood by a person skilled in the pertinent art. Because the user reporting the undesirable vehicle condition may be physically near the vehicle, short range communications can be utilized between the user device and the vehicle. Short range also allows for multiple visual identification methods such as license plate number, VIN number, QR code, bar code, and the like.

Multiple vehicles can be associated with the user profile. A primary vehicle can be selected from the multiple vehicles, and the primary vehicle selection can be changed from the user interface. The user profile can also be configured to register a secondary driver (e.g. family member, neighbor, valet driver, etc.) or in the case that any of the vehicles associated with the user profile are used by another driver or cared for by someone other than the primary user of the user profile.

Optionally, user profiles can be set to follow other user profiles so that messages can be sent between users who choose to follow each other, and/or broadcast to followers similar to current social media platforms. Additionally, or alternatively, users can provide vehicle condition alerts to other users anonymously. For instance, a first user may enter vehicle identification information of a third-party vehicle into the software application and select pre-determined vehicle conditions presented through the application, which can in turn result in an alert message being sent to a second user device of a second user running a similar software application without the first user or the second user having information as to the identity of the other user.

The notification can be anonymous in that the user sending the notification need not be given any information regarding the user profile associated with the vehicle identification. For instance, the user sending the notification may or may not receive a notification that the notification was received, or that a profile exists associated with the entered vehicle identification, but no other information need be provided to the user sending the notification. Users who choose to follow each other, or who are in a closed group, may be at least partially anonymous, in that users may be identified by their respective vehicle identification and may share, message, or otherwise communicate profile and/or other information between the group as desired by the respective user and/or as required by the closed group to which they belong.

FIGS. 2 through 13 are flow diagrams illustrating interaction with the graphical user interface when providing help to an unoccupied vehicle in various scenarios.

FIGS. 14 through 25 are flow diagrams illustrating interaction with the graphical user interface when providing help to an occupied vehicle in various scenarios.

Regarding FIGS. 1 through 25, text in screens and possible predetermined selections presented in the flow diagrams are non-limiting examples and numerous alternative language and selections as understood by a person skilled in the art are to be understood to be included in the present disclosure.

Prior to each scenario in FIGS. 2 through 25, a first user observes a vehicle in an undesirable state (as specified in each of the respective figures). Using the software application the first user enters a vehicle identification (e.g. license plate number, etc.). Next it is determined whether the vehicle's identification is associated with a user account of a second user. This determination can be made by the software application on the first user device. Additionally, or alternatively, the determination can be made by a vehicle condition notification service provider system configured to receive information from the first user device and provide information to the second user device. The software application may further indicate whether or not the second user's device is active such that the second user is likely able to receive alerts from the software application.

In some scenarios, such as illustrated in FIGS. 15, 17, and 20-24, the software application may not allow the first user to send a message. In the other respective scenarios, the software application sends a selected message to the second user's device via the software application on the user devices of the first and second users. The software application can further be configured to send a confirmation message to the first user's device to confirm that the message was received by the second user's device and/or that the software application on the second user's device was engaged to display the message to the second user. The software application may further update account information of the first and/or second user based on this interaction. Upon the completion of notifying the second user, the software application may further be configured to display a message to on the graphical user interface of the first user's device indicating a count of how many times the first user has sent messages through the software application to notify other users of undesirable vehicle states. The software application may also provide rewards to the first user and may display a countdown of undesirable vehicle state notifications that the first user is required to send to receive a reward.

FIG. 2 illustrates a user interaction with the software application in a scenario in which the first user observes an unoccupied vehicle with its headlights on. The first user may click "Provide help" (see FIG. 1A), then click "No" in a pop-up screen that reads, "Is vehicle occupied?", then click "Headlight" (see FIG. 1B), then click "Yes" in a pop-up screen that reads, "Tell the L2C user their headlights are on and its problematic." The software application sends an alert message to the second user's device via the software application. The alert message is based at least in part on the selections made by the first user as illustrated in FIG. 2.

The software application on the first user device may confirm receipt of the alert message by the second user device. Confirmation of receipt can be indicated by displaying a message that reads, "You have now helped x amount of people in the community. You're y more away from . . . ", where x and y are numerical values and the message concludes with a promise of a reward. Similarly, this message as illustrated in other figures of this Application, can function as a confirmation of receipt of alert by the second device. Confirmation of receipt can be otherwise indicated in a message without a count of community members helped and/or without a promise of a reward, which can also be true where the message is illustrated in other figures of this Application.

The software application may update account information of the first and/or second user. For instance, the account information may include a record of vehicle conditions reported by the user and/or a record of vehicle conditions associated with vehicles associated with the user profile; and this information may be updated in response to successfully sending an alert such as illustrated in FIG. 2 and elsewhere herein.

Figure 3:
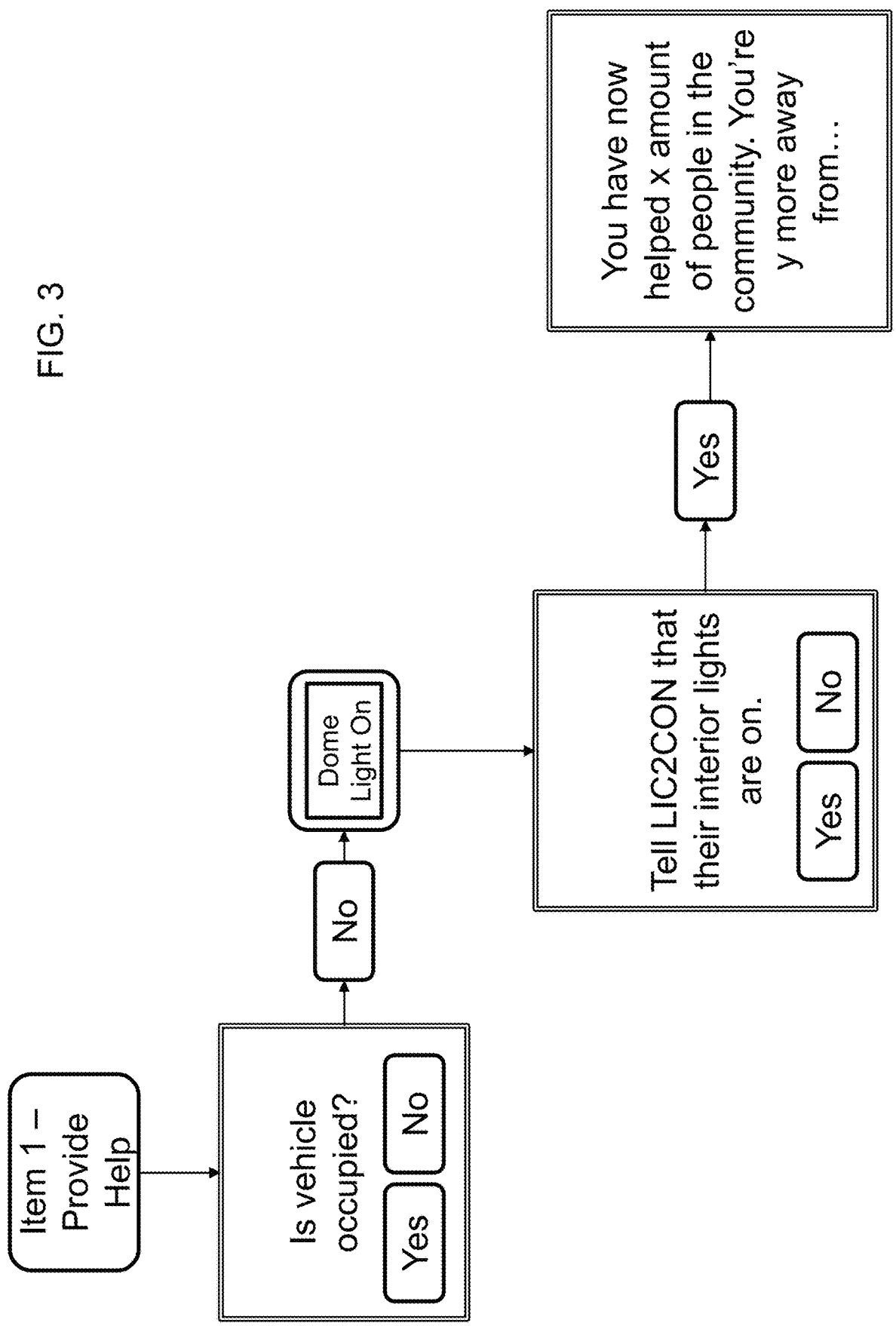

FIG. 3 illustrates a user interaction with the software application in a scenario in which the first user observes an unoccupied vehicle with its dome light on. The first user may click "Provide help" (see FIG. 1A), then click "No" in a pop-up screen that reads, "Is vehicle occupied?", then click "Dome light on" (see FIG. 1B), then click "Yes" in a pop-up screen that reads, "Tell the L2C user their dome light is on." communication The software application sends the message to the second user's device via the software application. The software application may confirm receipt of the message. The software application may update account information of the first and/or second user.

Figure 4:
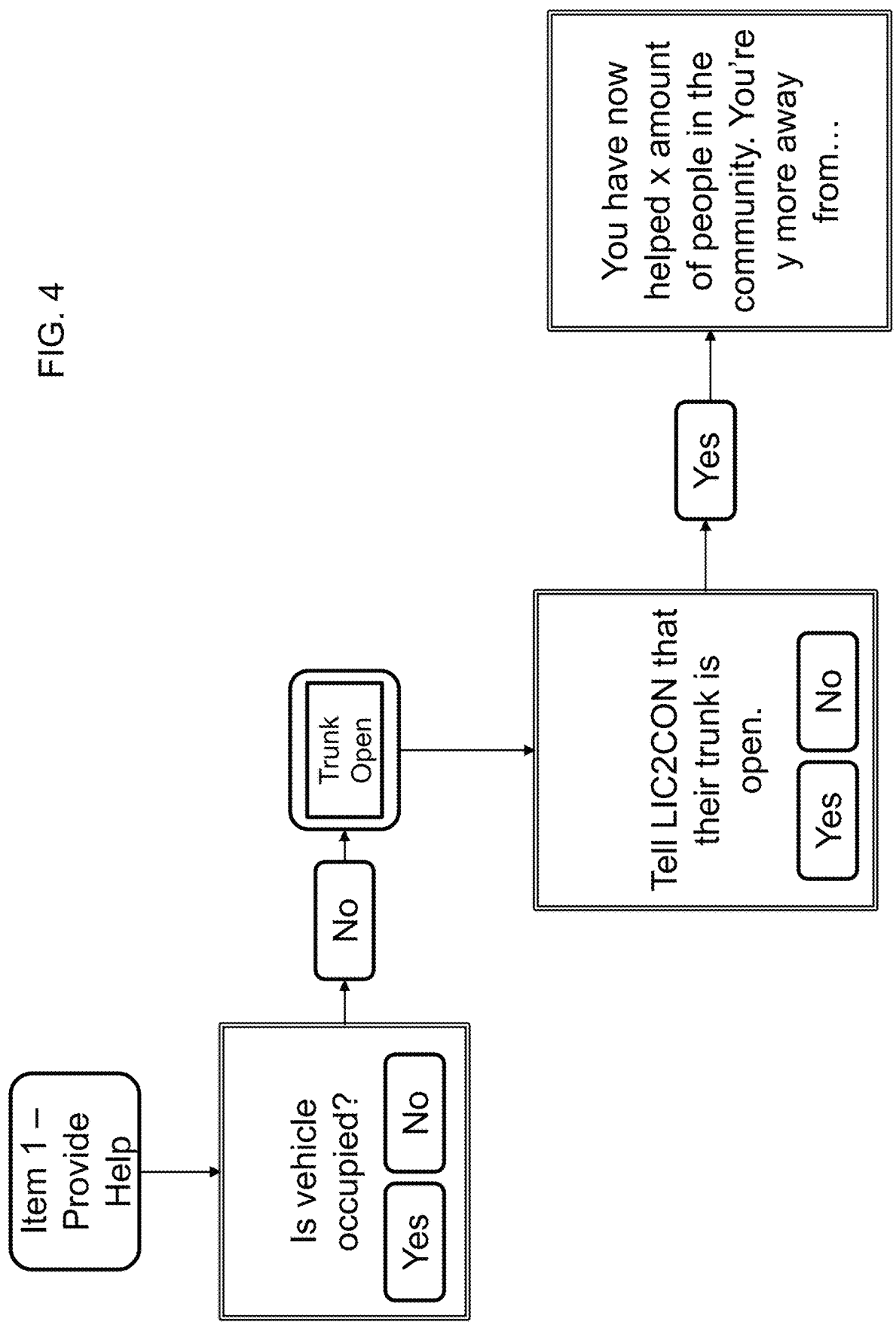

FIG. 4 illustrates a user interaction with the software application in a scenario in which the first user observes an unoccupied vehicle with its trunk open. The first user may click "Provide help" (see FIG. 1A), then click "No" in a pop-up screen that reads, "Is vehicle occupied?", then click "Trunk open" (see FIG. 1B), then click "Yes" in a pop-up screen that reads, "Tell the L2C user their trunk is open." The software application sends the message to the second user's device via the software application. The software application may confirm receipt of the message. The software application may update account information of the first and/or second user.

Figure 5:
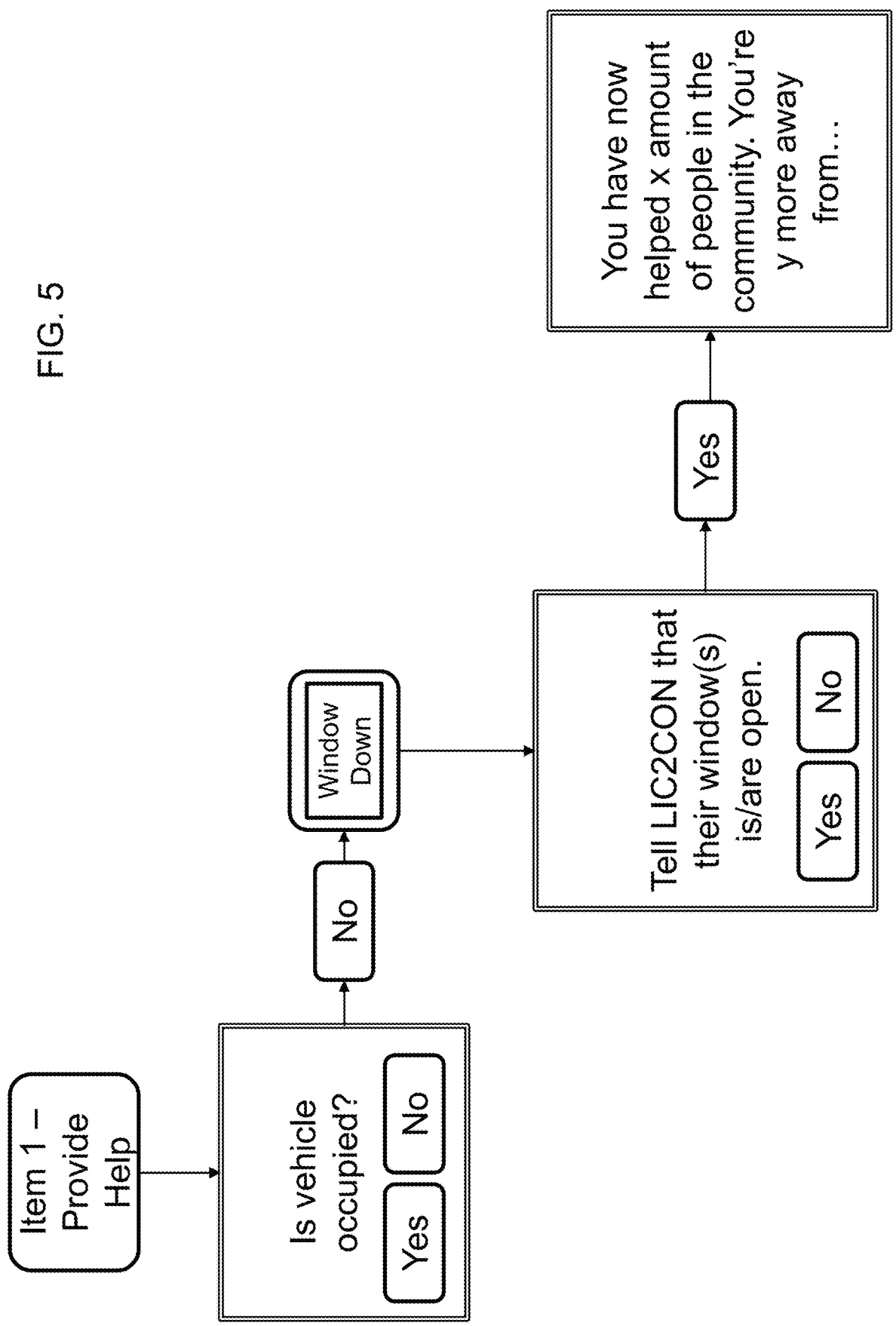

FIG. 5 illustrates a user interaction with the software application in a scenario in which the first user observes an unoccupied vehicle with one or more windows open. The first user may click "Provide help" (see FIG. 1A), then click "No" in a pop-up screen that reads, "Is vehicle occupied?", then click "Window down" (see FIG. 1B), then click "Yes" in a pop-up screen that reads, "Tell the L2C user their window(s) is/are open." The software application sends the message to the second user's device via the software application. The software application may confirm receipt of the message. The software application may update account information of the first and/or second user.

Figure 6:
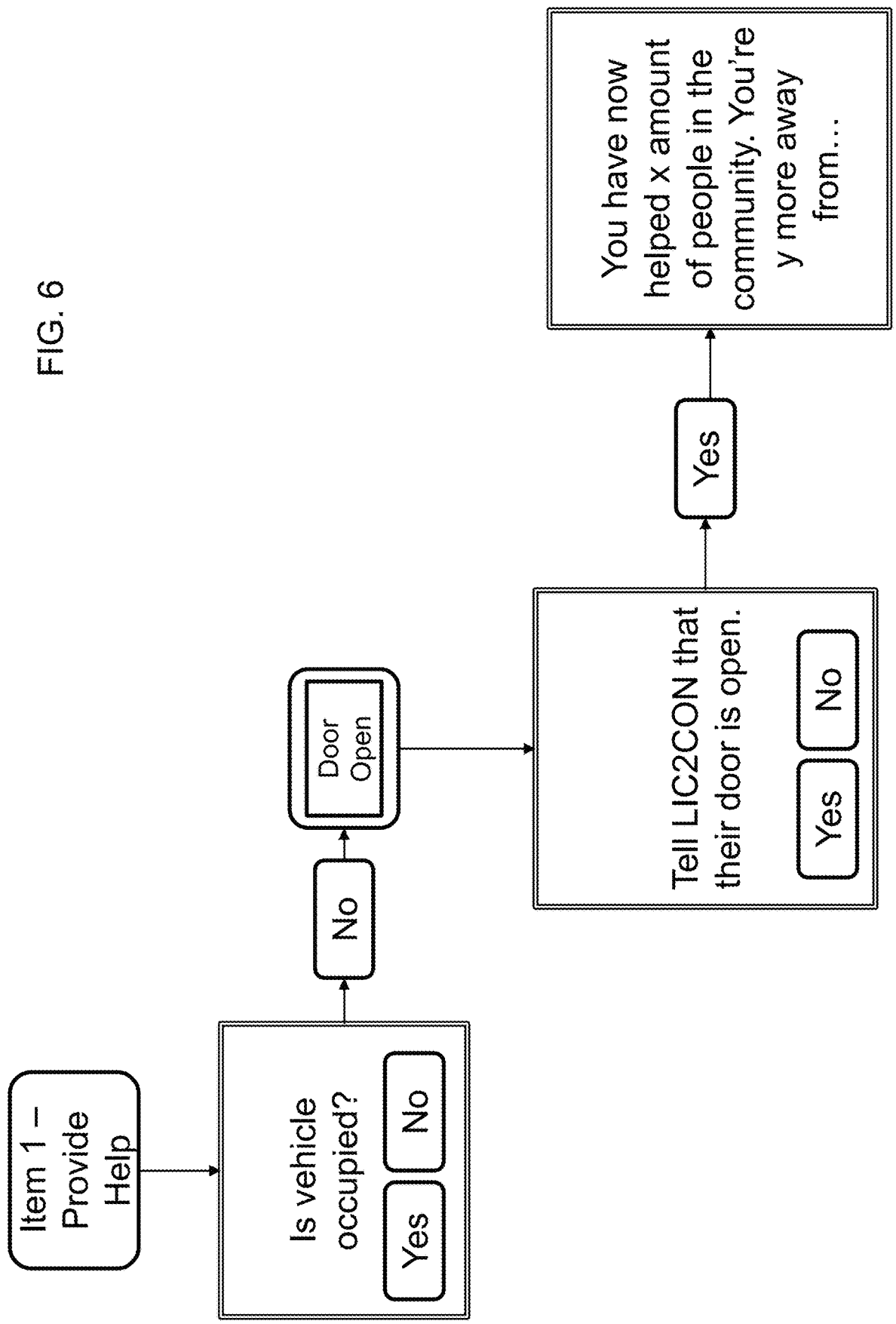

FIG. 6 illustrates a user interaction with the software application in a scenario in which the first user observes an unoccupied vehicle with one or more doors open. The first user may click "Provide help" (see FIG. 1A), then click "No" in a pop-up screen that reads, "Is vehicle occupied?", then click "Door open" (see FIG. 1B), then click "Yes" in a pop-up screen that reads, "Tell the L2C user their door is open." The software application sends the message to the second user's device via the software application. The software application may confirm receipt of the message. The software application may update account information of the first and/or second user.

Figure 7:
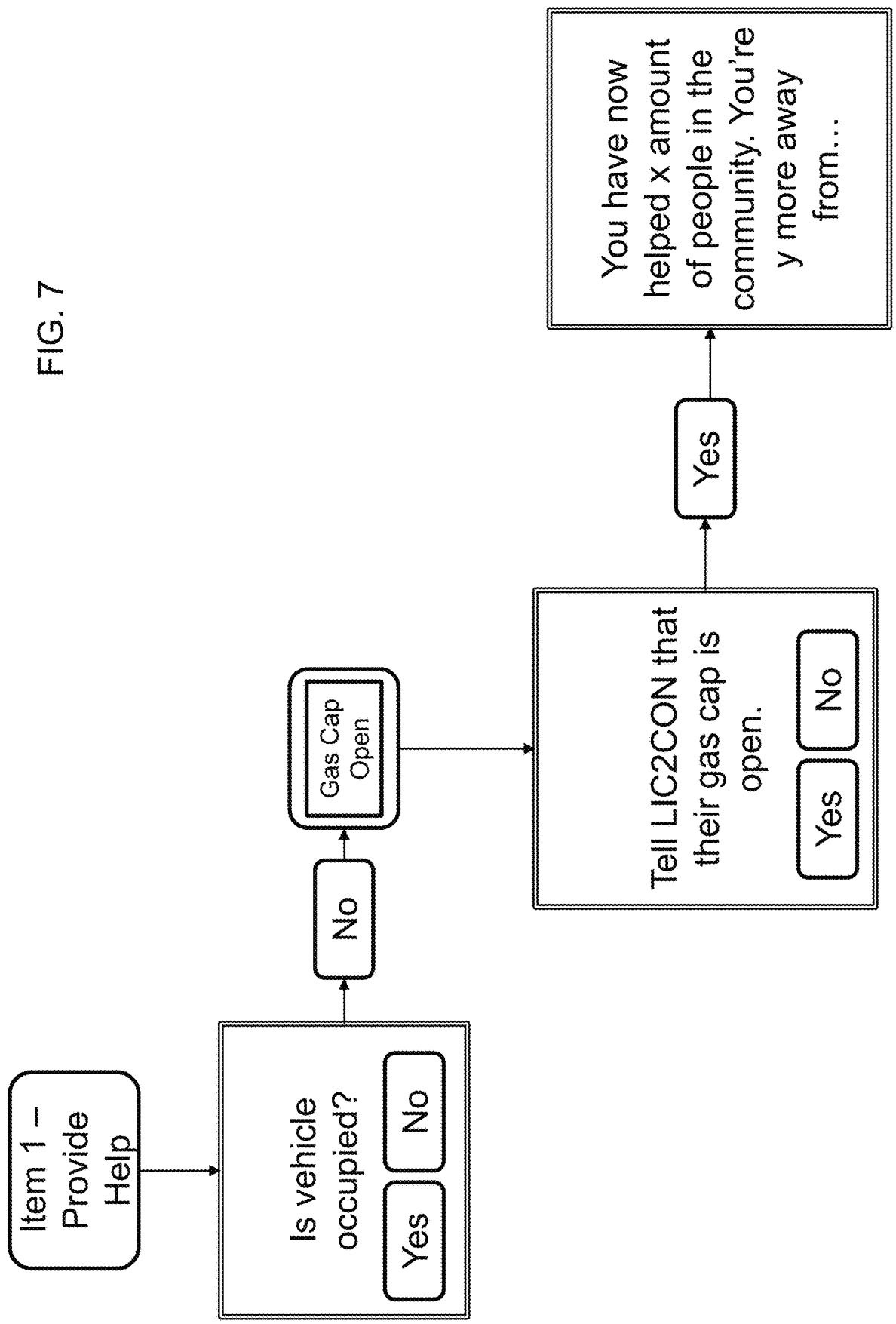

FIG. 7 illustrates a user interaction with the software application in a scenario in which the first user observes an unoccupied vehicle with its gas cap open. The first user may click "Provide help" (see FIG. 1A), then click "No" in a pop-up screen that reads, "Is vehicle occupied?", then click "Gas cap open" (see FIG. 1B), then click "Yes" in a pop-up screen that reads, "Tell the L2C user their gas cap is open." The software application sends the message to the second user's device via the software application. The software application may confirm receipt of the message. The software application may update account information of the first and/or second user.

Figure 8:
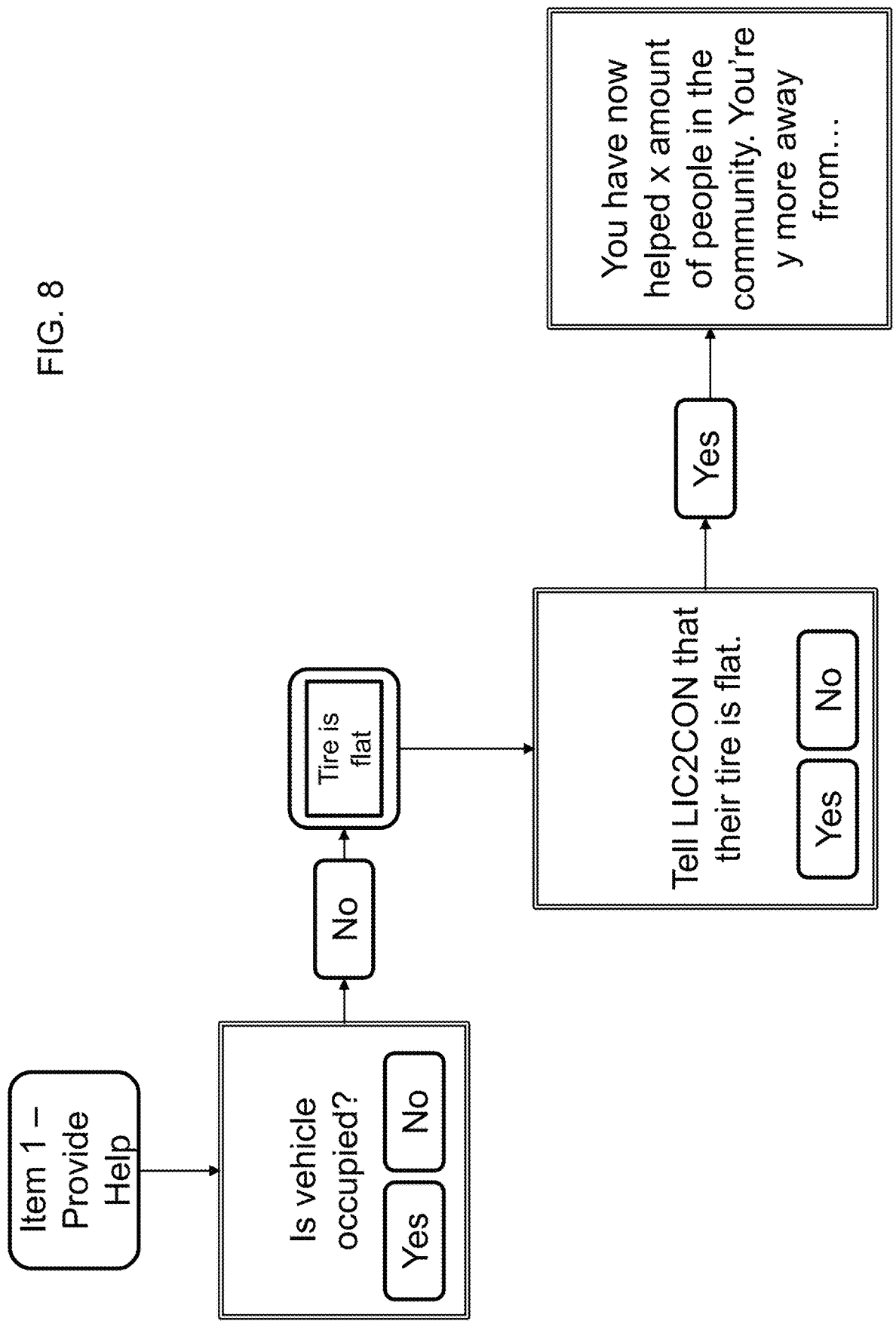

FIG. 8 illustrates a user interaction with the software application in a scenario in which the first user observes an unoccupied vehicle with one or more flat tires. The first user may click "Provide help" (see FIG. 1A), then click "No" in a pop-up screen that reads, "Is vehicle occupied?", then click "Tire is flat" (see FIG. 1B), then click "Yes" in a pop-up screen that reads, "Tell the L2C user their tire is flat." The software application sends the message to the second user's device via the software application. The software application may confirm receipt of the message. The software application may update account information of the first and/or second user.

Figure 9:
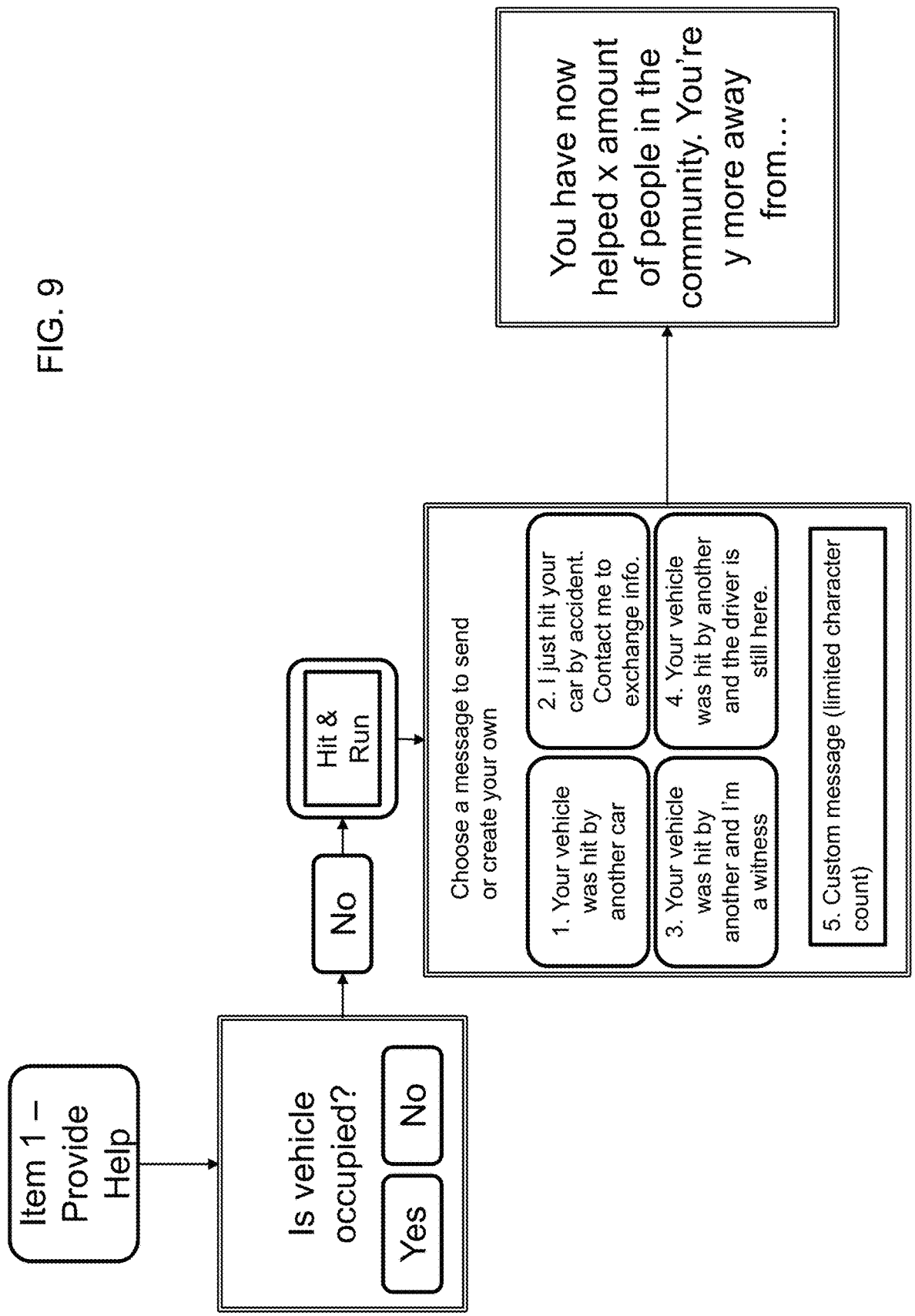

FIG. 9 illustrates a user interaction with the software application in a scenario in which the first user observes an unoccupied vehicle involved in a hit and run. The first user may click "Provide help" (see FIG. 1A), then click "No" in a pop-up screen that reads, "Is vehicle occupied?", then click "Hit & Run" (see FIG. 1B), then select or enter a message to send to the second user in a pop-up screen that provides a selection of common useful messages and an input box in which the first user may enter a custom message. The software application sends the selected or entered message to the second user's device via the software application. The software application may confirm receipt of the message. The software application may update account information of the first and/or second user.

Figure 10:
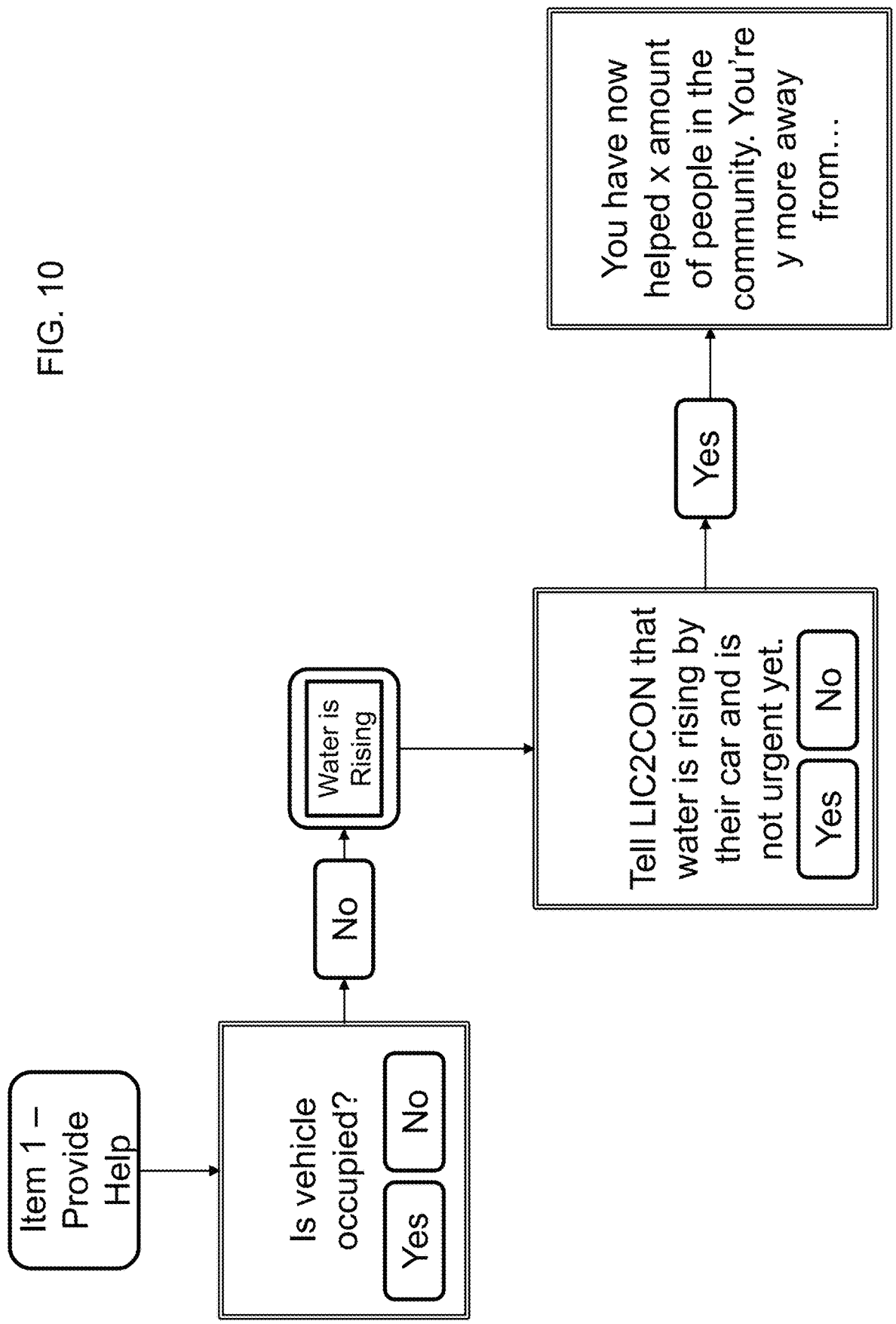

FIG. 10 illustrates a user interaction with the software application in a scenario in which the first user observes an unoccupied vehicle parked in rising water. The first user may click "Provide help" (see FIG. 1A), then click "No" in a pop-up screen that reads, "Is vehicle occupied?", then click "Water is rising" (see FIG. 1B), then click "Yes" in a pop-up screen that reads, "Tell the L2C user water is rising by their car and is not urgent yet." The software application sends the message to the second user's device via the software application. The software application may confirm receipt of the message. The software application may update account information of the first and/or second user.

Figure 11:
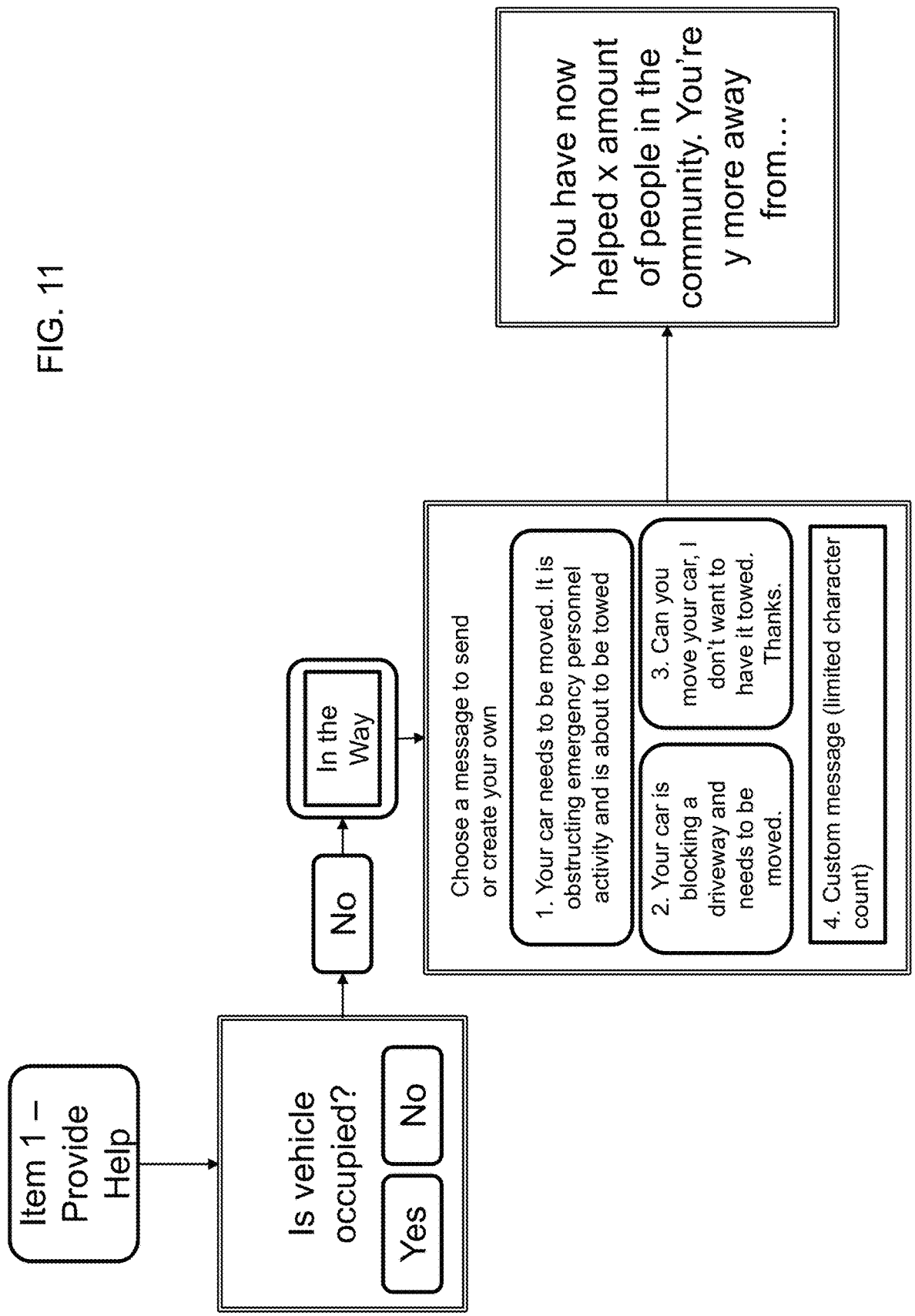

FIG. 11 illustrates a user interaction with the software application in a scenario in which the first user observes an unoccupied vehicle obstructing an entrance or otherwise in the way of other vehicles. The first user may click "Provide help" (see FIG. 1A), then click "No" in a pop-up screen that reads, "Is vehicle occupied?", then click "In the way" (see FIG. 1B), then select or enter a message to send to the second user in a pop-up screen that provides a selection of common useful messages and an input box in which the first user may enter a custom message. The software application sends the selected or entered message to the second user's device via the software application. The software application may confirm receipt of the message. The software application may update account information of the first and/or second user.

Figure 12:
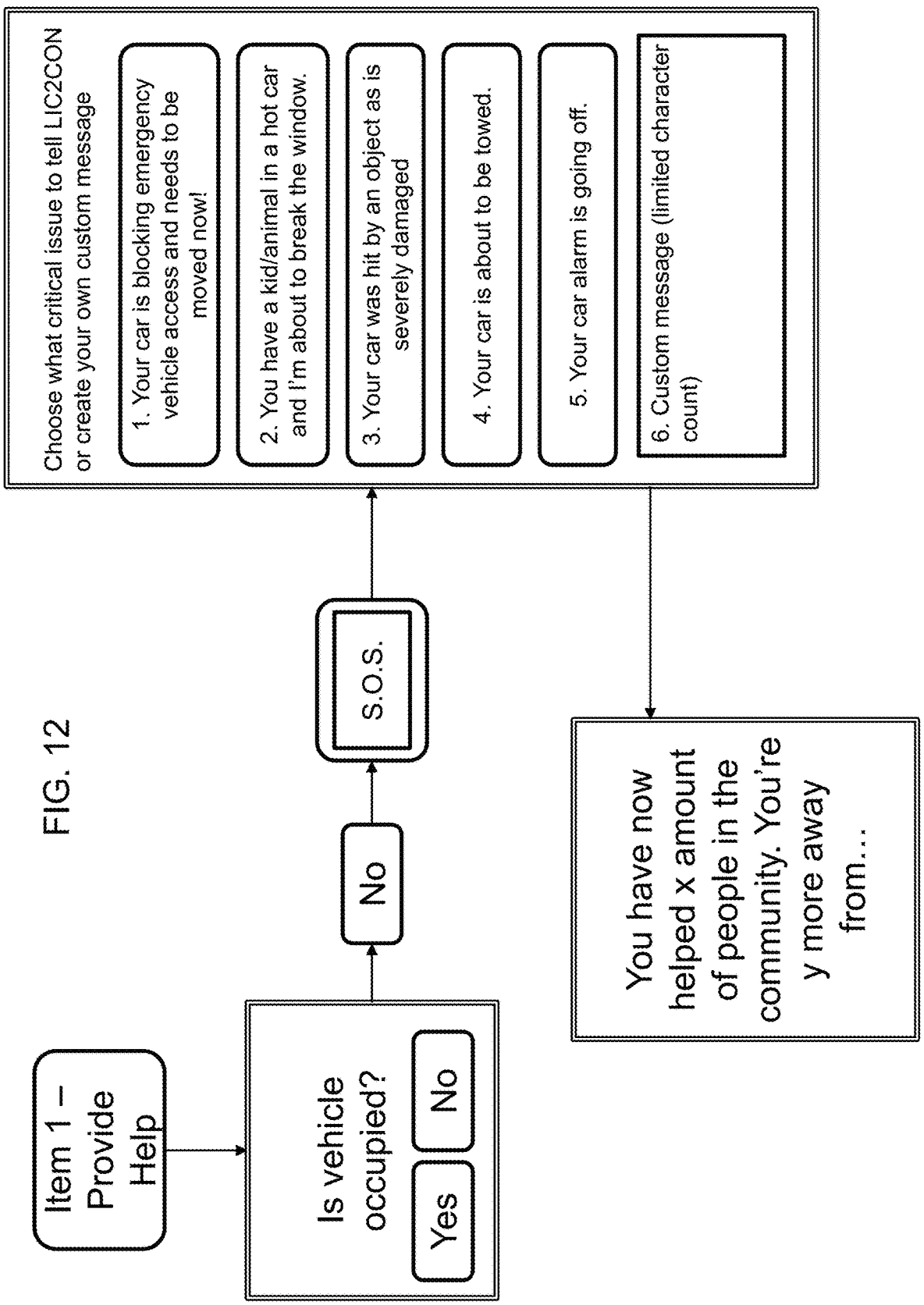

FIG. 12 illustrates a user interaction with the software application in a scenario in which the first user observes a developing emergency of an unoccupied vehicle. The first user may click "Provide help" (see FIG. 1A), then click "No" in a pop-up screen that reads, "Is vehicle occupied?", then click "S.O.S." (see FIG. 1B), then select or enter a message to send to the second user in a pop-up screen that provides a selection of common useful messages and an input box in which the first user may enter a custom message. The software application sends the selected or entered message to the second user's device via the software application. The software application may confirm receipt of the message. The software application may update account information of the first and/or second user.

Figure 13:
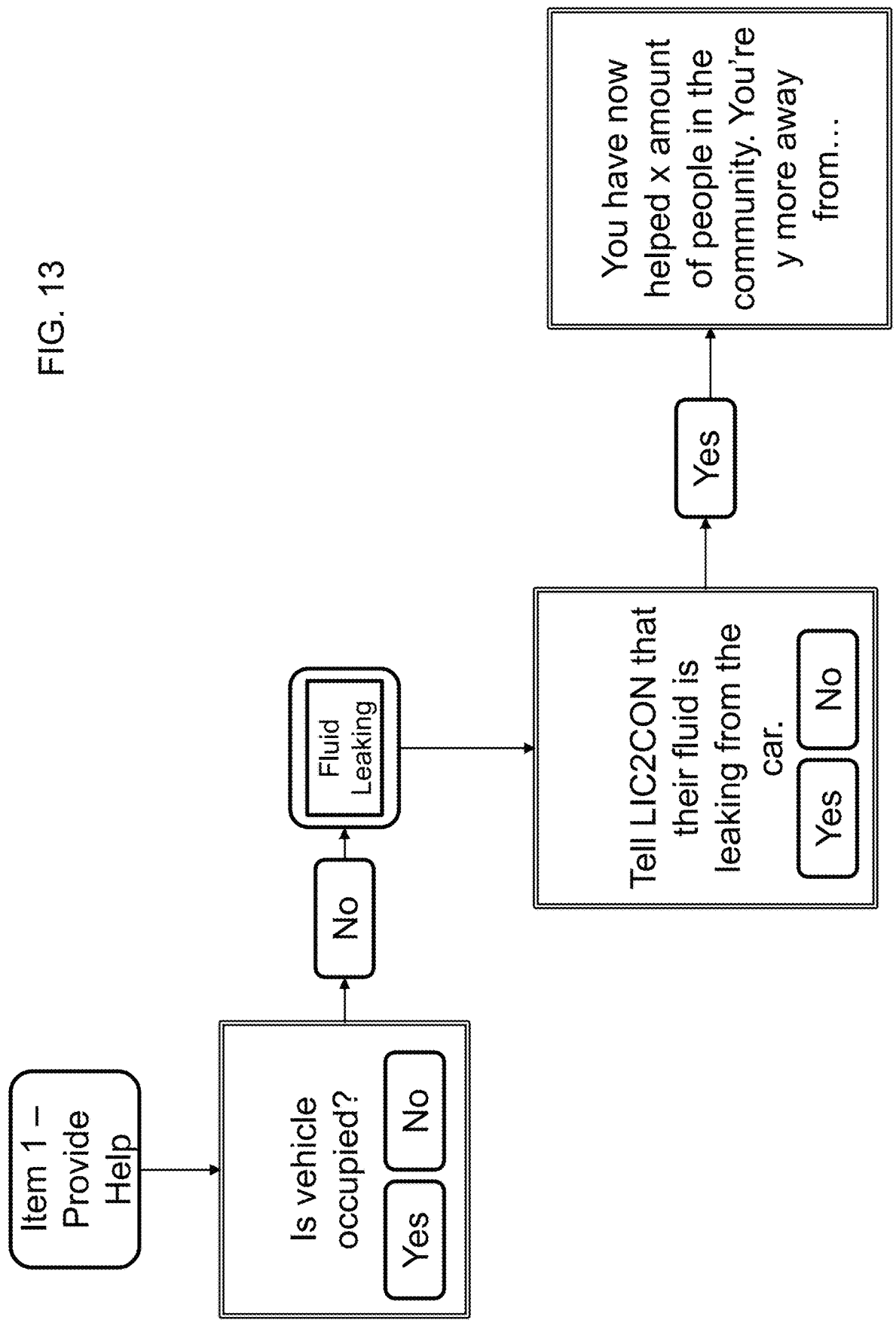

FIG. 13 illustrates a user interaction with the software application in a scenario in which the first user observes an unoccupied vehicle leaking fluid. The first user may click "Provide help" (see FIG. 1A), then click "No" in a pop-up screen that reads, "Is vehicle occupied?", then click "Fluid leaking" (see FIG. 1B), then click "Yes" in a pop-up screen that reads, "Tell the L2C user fluid is leaking from their car." The software application sends the message to the second user's device via the software application. The software application may confirm receipt of the message. The software application may update account information of the first and/or second user.

Figure 14:
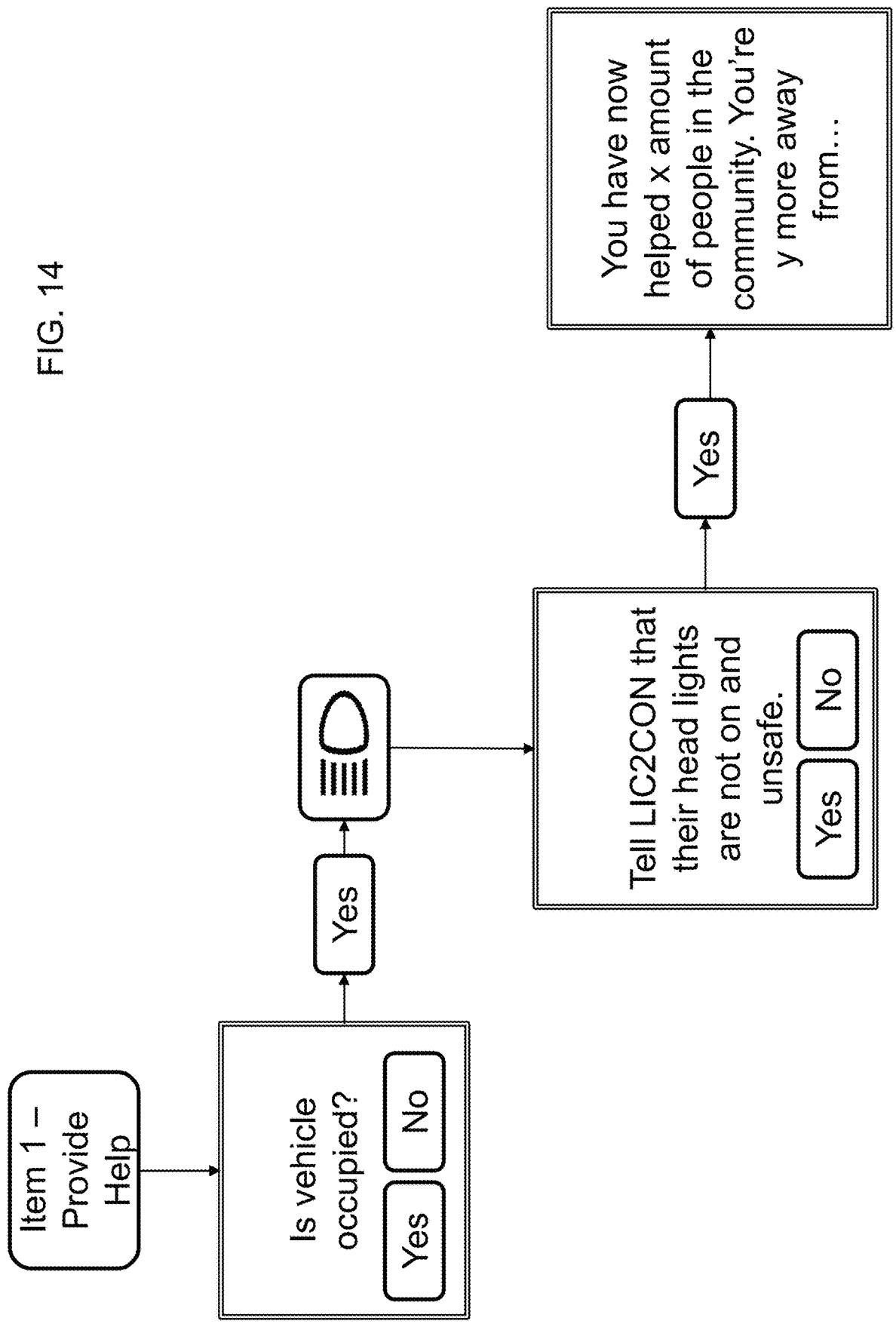
FIGS. 14 through 25 are flow diagrams illustrating interaction with the graphical user interface when providing help to an occupied vehicle in various scenarios according to aspects of the present invention.

FIG. 14 illustrates a user interaction with the software application in a scenario in which the first user observes an occupied vehicle at night with its headlights off. The first user may click "Provide help" (see FIG. 1A), then click "Yes" in a pop-up screen that reads, "Is vehicle occupied?", then click "Headlight" (see FIG. 1B), then click "Yes" in a pop-up screen that reads, "Tell the L2C user their headlights are not on and unsafe." The software application sends the message to the second user's device via the software application. The software application may confirm receipt of the message. The software application may update account information of the first and/or second user.

Figure 15:
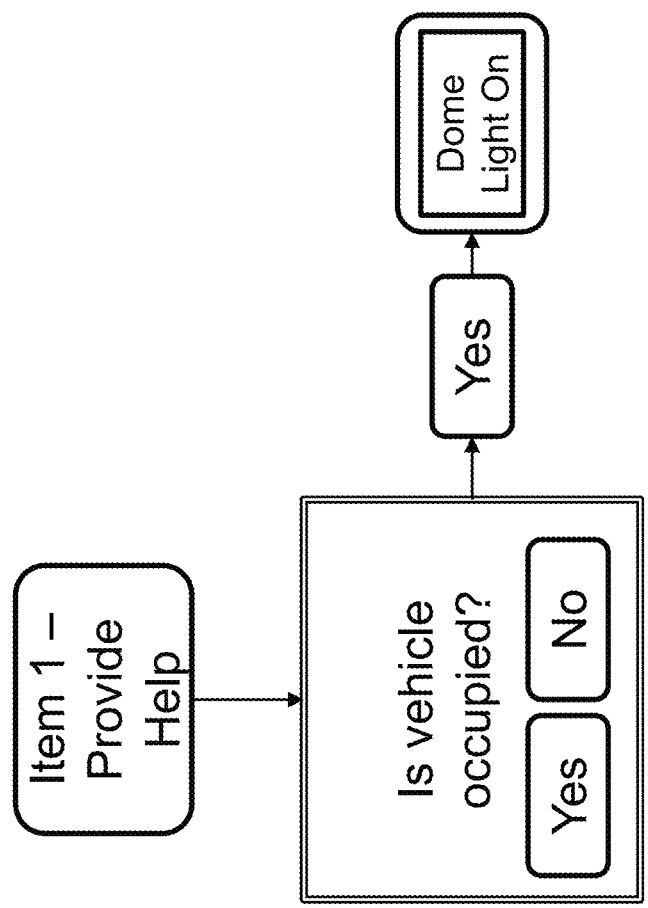

FIG. 15 illustrates a user interaction with the software application in a scenario in which the first user observes an occupied vehicle with its dome light on. The first user may click "Provide help" (see FIG. 1A), then click "Yes" in a pop-up screen that reads, "Is vehicle occupied?". In this scenario, the "Dome light on" (see FIG. 1B) button is deactivated because the situation would not normally need to be brought to the attention of the vehicle operator. The software application does not send a message to the second user's device. The software application may display or otherwise provide a message to the first user explaining why the "Dome light on" button is deactivated.

Figure 16:
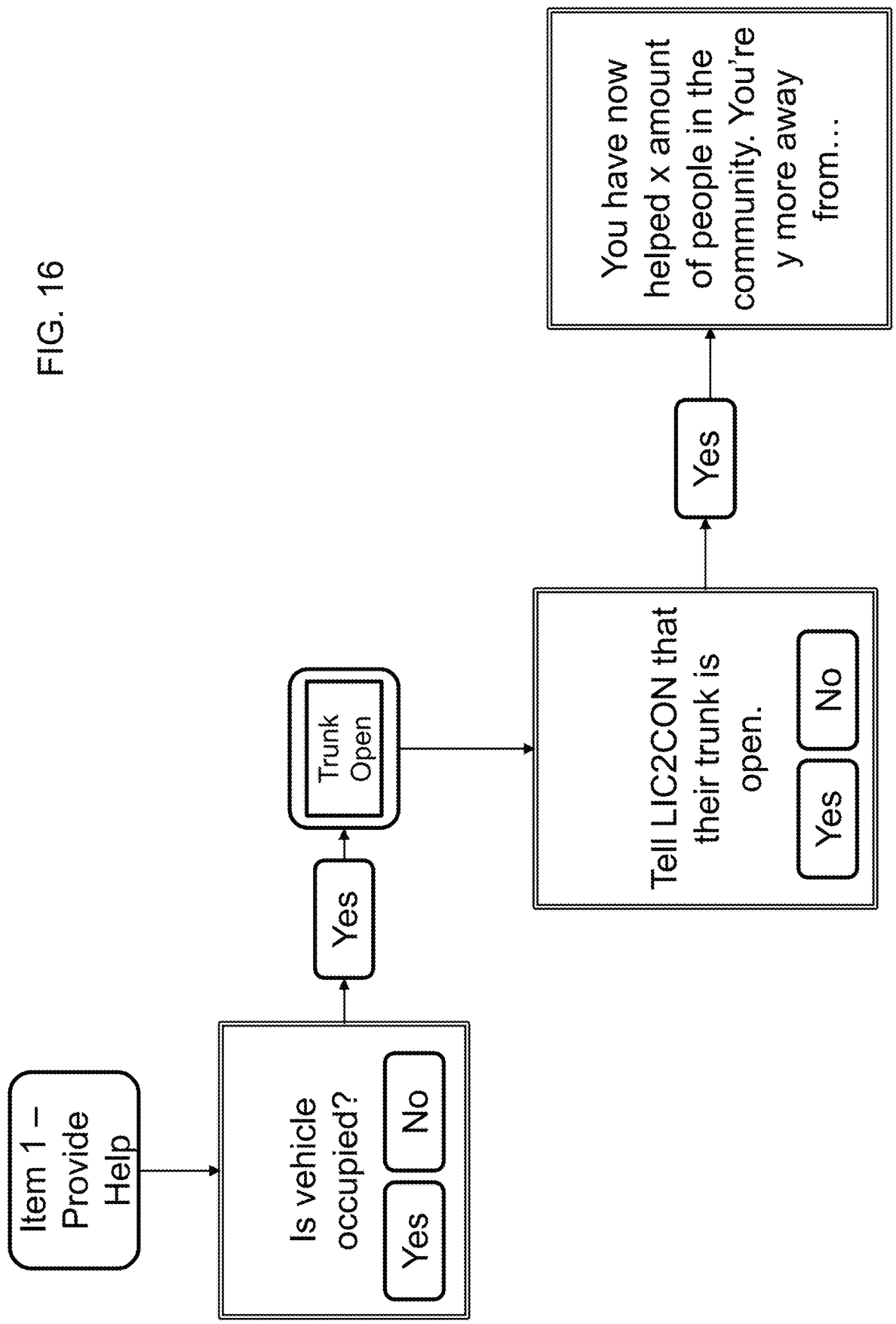

FIG. 16 illustrates a user interaction with the software application in a scenario in which the first user observes an occupied vehicle with its trunk open. The first user may click "Provide help" (see FIG. 1A), then click "Yes" in a pop-up screen that reads, "Is vehicle occupied?", then click "Trunk open" (see FIG. 1B), then click "Yes" in a pop-up screen that reads, "Tell the L2C user their trunk is open." The software application sends the message to the second user's device via the software application. The software application may confirm receipt of the message. The software application may update account information of the first and/or second user.

Figure 17:
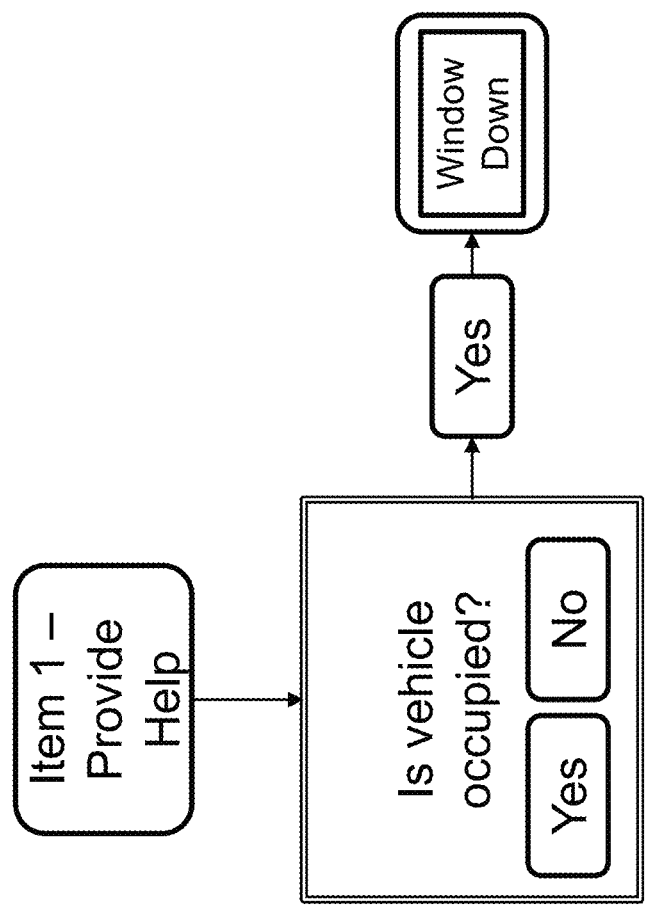

FIG. 17 illustrates a user interaction with the software application in a scenario in which the first user observes an occupied vehicle with one or more windows open. The first user may click "Provide help" (see FIG. 1A), then click "Yes" in a pop-up screen that reads, "Is vehicle occupied?". In this scenario, the "Window down" (see FIG. 1B) button is deactivated because the situation would not normally need to be brought to the attention of the vehicle operator. The software application does not send a message to the second user's device. The software application may display or otherwise provide a message to the first user explaining why the "Window down" button is deactivated.

Figure 18:
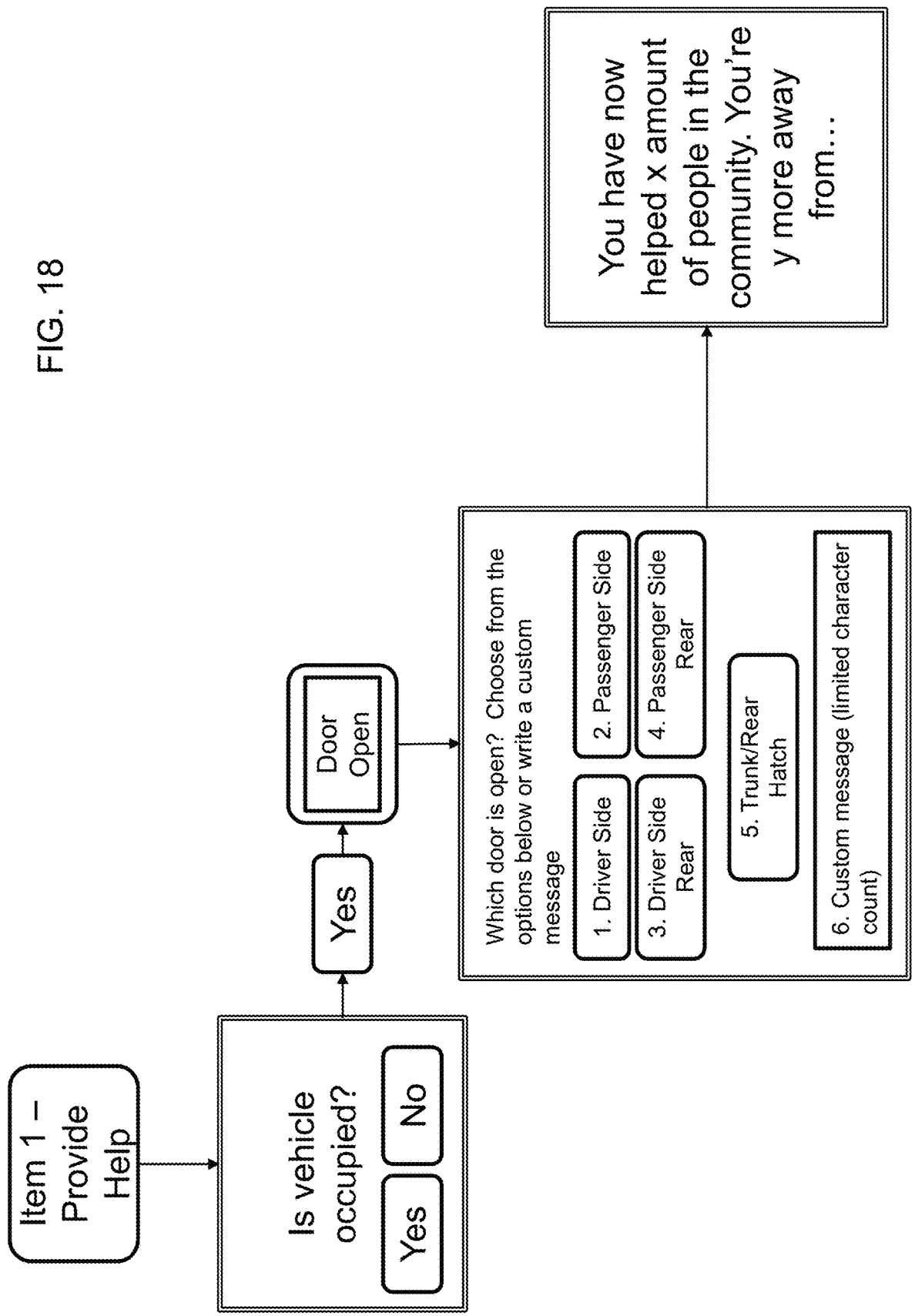

FIG. 18 illustrates a user interaction with the software application in a scenario in which the first user observes an occupied vehicle with one or more doors open. The first user may click "Provide help" (see FIG. 1A), then click "Yes" in a pop-up screen that reads, "Is vehicle occupied?". then click "Door open" (see FIG. 1B), then then select or enter a message to send to the second user in a pop-up screen that provides a selection of common useful messages and an input box in which the first user may enter a custom message. The software application sends the message to the second user's device via the software application. The software application may confirm receipt of the message. The software application may update account information of the first and/or second user.

Figure 19:
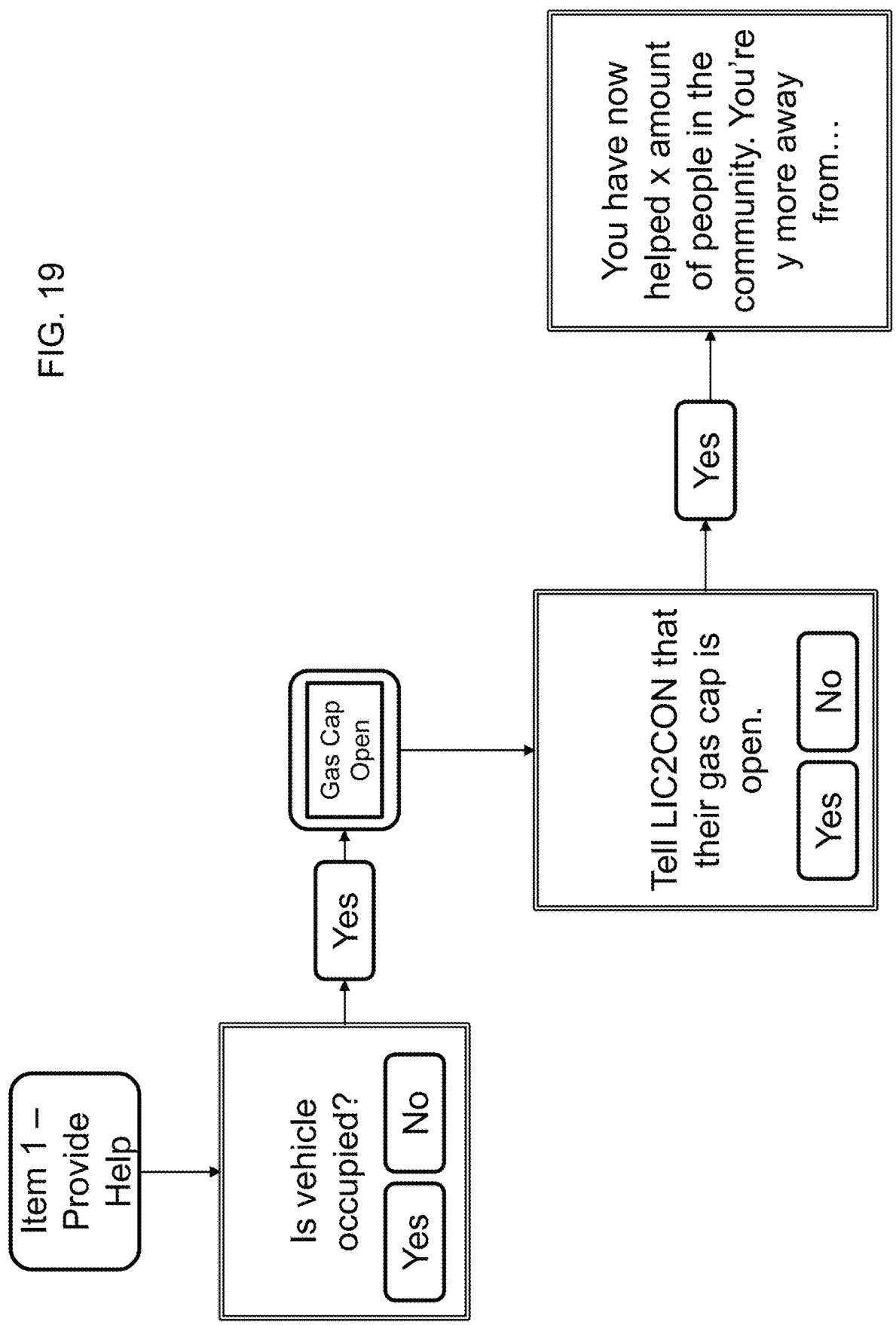

FIG. 19 illustrates a user interaction with the software application in a scenario in which the first user observes an occupied vehicle with its gas cap open. The first user may click "Provide help" (see FIG. 1A), then click "Yes" in a pop-up screen that reads, "Is vehicle occupied?", then click "Gas cap open" (see FIG. 1B), then click "Yes" in a pop-up screen that reads, "Tell the L2C user their gas cap is open." The software application sends the message to the second user's device via the software application. The software application may confirm receipt of the message. The software application may update account information of the first and/or second user.

Figure 20:
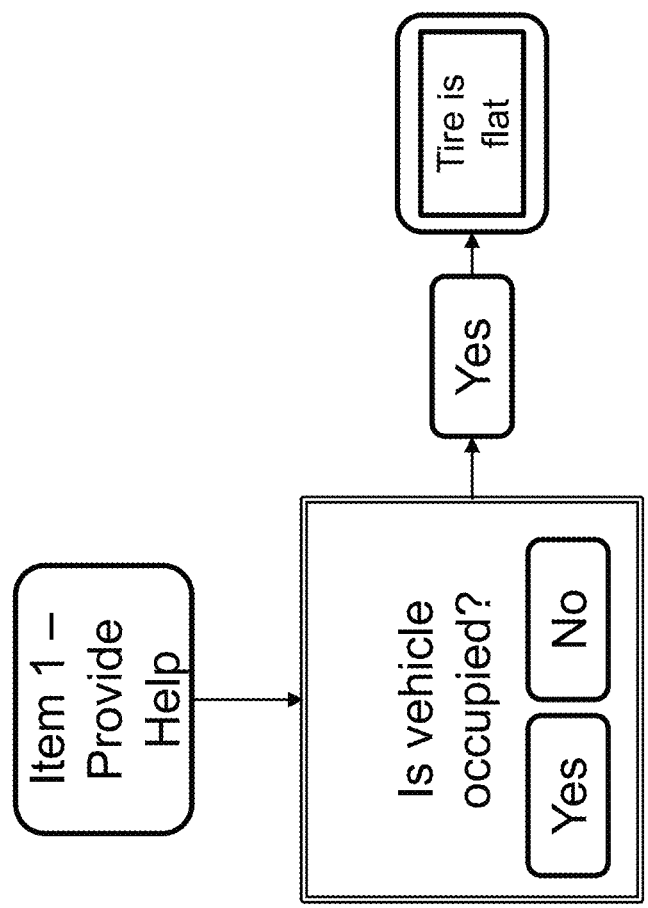

FIG. 20 illustrates a user interaction with the software application in a scenario in which the first user observes an occupied vehicle with one or more flat tires. The first user may click "Provide help" (see FIG. 1A), then click "Yes" in a pop-up screen that reads, "Is vehicle occupied?". In this scenario, the "Tire is flat" (see FIG. 1B) button is deactivated because the situation would not normally need to be brought to the attention of the vehicle operator. The software application does not send a message to the second user's device. The software application may display or otherwise provide a message to the first user explaining why the "Tire is flat" button is deactivated.

Figure 21:
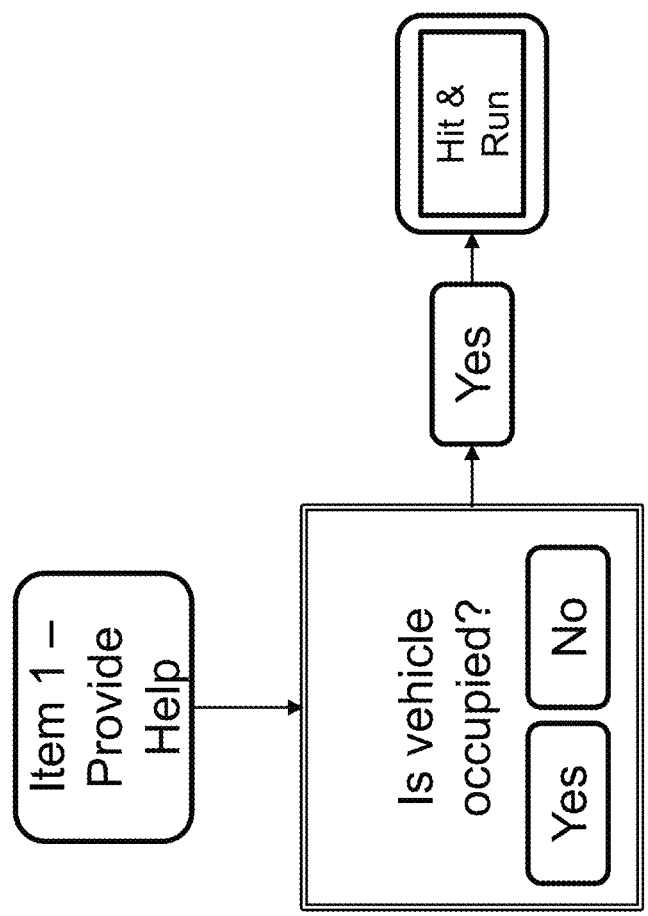

FIG. 21 illustrates a user interaction with the software application in a scenario in which the first user observes an occupied vehicle involved in a hit and run. The first user may click "Provide help" (see FIG. 1A), then click "Yes" in a pop-up screen that reads, "Is vehicle occupied?". In this scenario, the "Hit & Run" (see FIG. 1B) button is deactivated because the situation would not normally need to be brought to the attention of the vehicle operator. The software application does not send a message to the second user's device. The software application may display or otherwise provide a message to the first user explaining why the "Hit & Run" button is deactivated.

Figure 22:
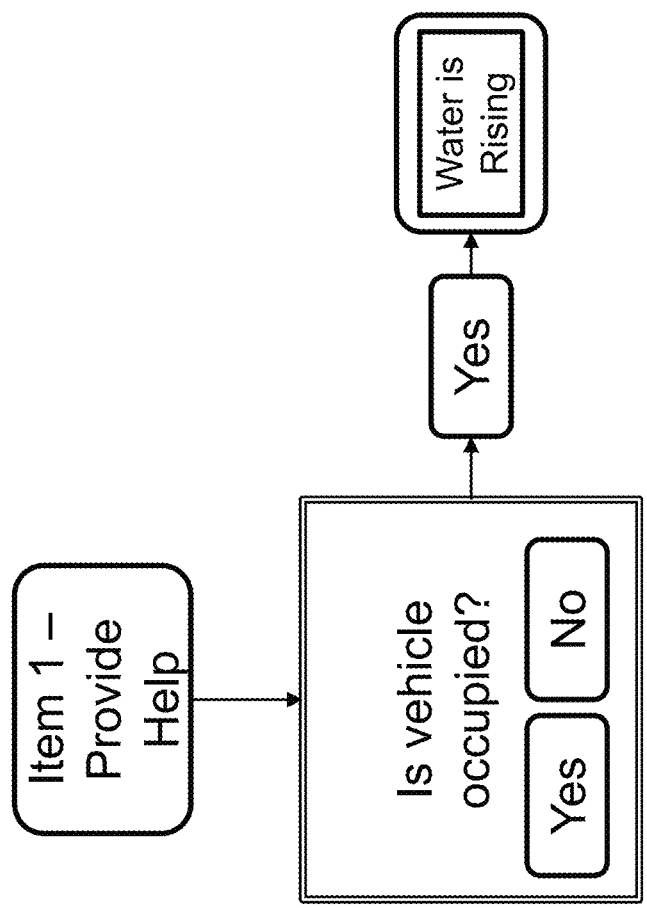

FIG. 22 illustrates a user interaction with the software application in a scenario in which the first user observes an occupied vehicle parked in rising water. The first user may click "Provide help" (see FIG. 1A), then click "Yes" in a pop-up screen that reads, "Is vehicle occupied?". In this scenario, the "Water is rising" (see FIG. 1B) button is deactivated because the situation would not normally need to be brought to the attention of the vehicle operator. The software application does not send a message to the second user's device. The software application may display or otherwise provide a message to the first user explaining why the "Water is rising" button is deactivated.

Figure 23:
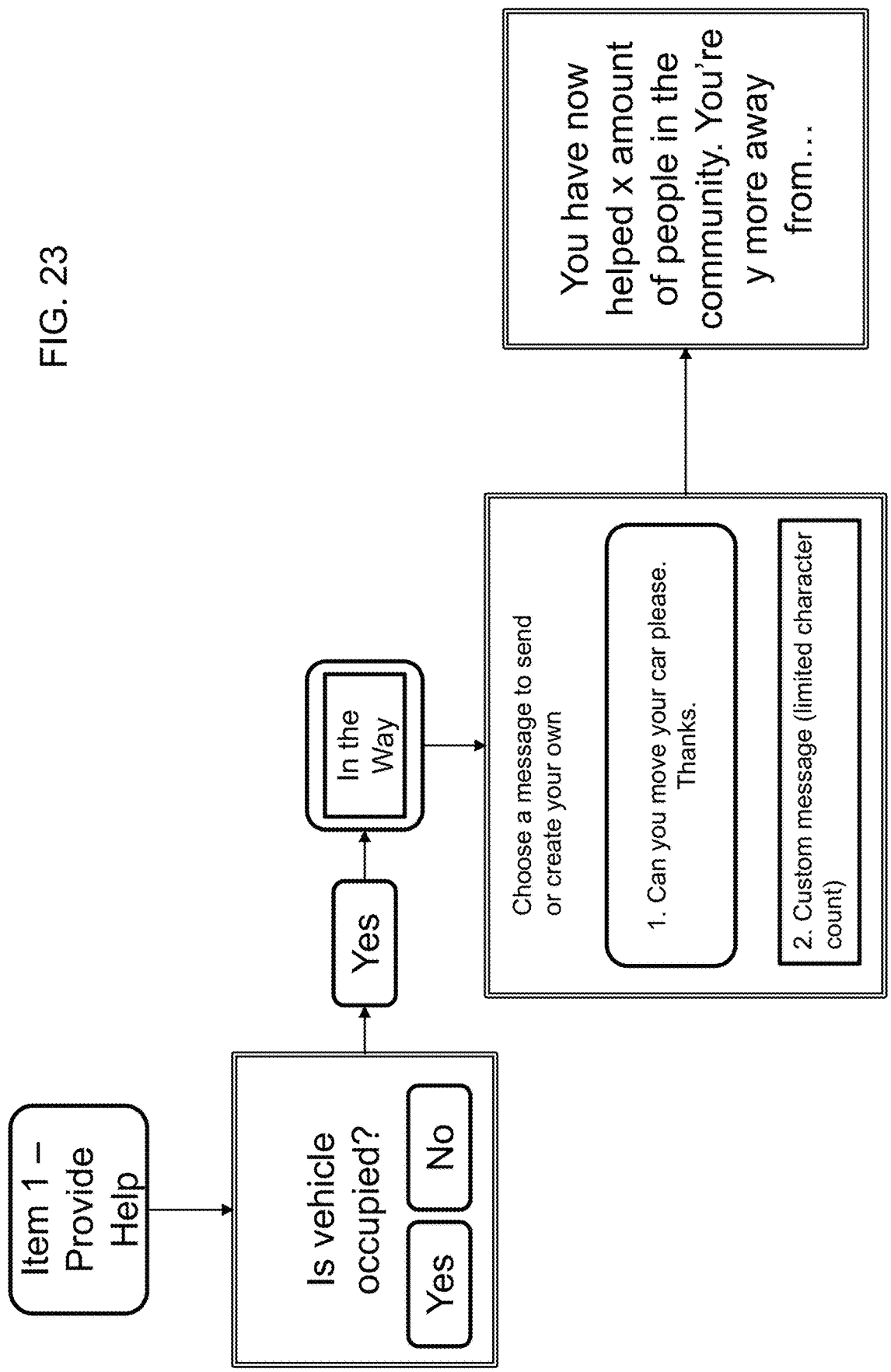

FIG. 23 illustrates a user interaction with the software application in a scenario in which the first user observes an occupied vehicle obstructing an entrance or otherwise in the way of other vehicles. The first user may click "Provide help" (see FIG. 1A), then click "Yes" in a pop-up screen that reads, "Is vehicle occupied?", then click "In the way" (see FIG. 1B), then select or enter a message to send to the second user in a pop-up screen that provides a selection of common useful messages and an input box in which the first user may enter a custom message. The software application sends the selected or entered message to the second user's device via the software application. The software application may confirm receipt of the message. The software application may update account information of the first and/or second user.

Figure 24:
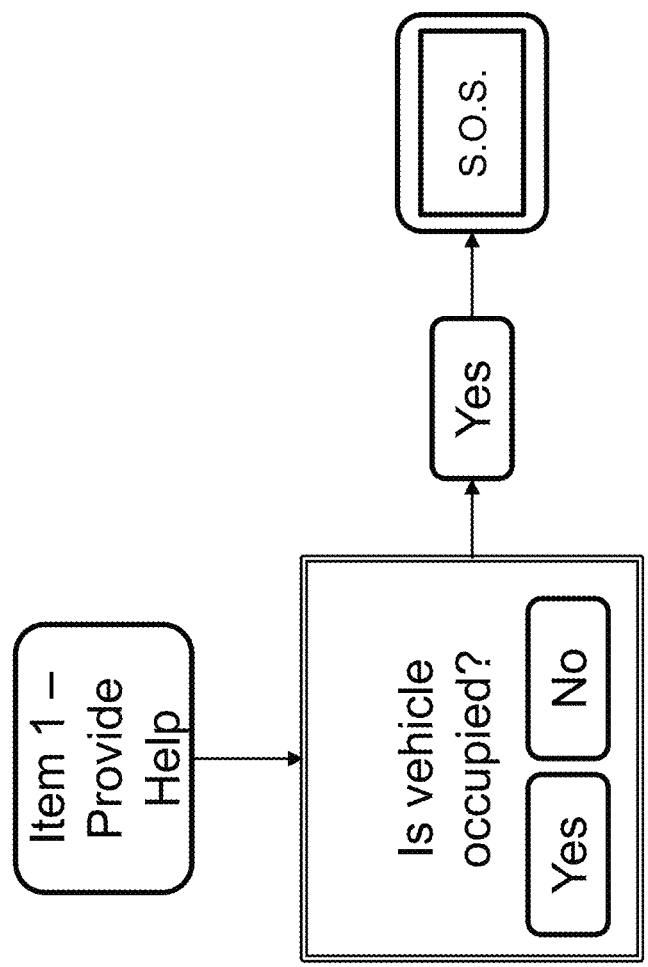

FIG. 24 illustrates a user interaction with the software application in a scenario in which the first user observes a developing emergency of an occupied vehicle. The first user may click "Provide help" (see FIG. 1A), then click "Yes" in a pop-up screen that reads, "Is vehicle occupied?". In this scenario, the "Window down" (see FIG. 1B) button is deactivated because the situation would not normally need to be brought to the attention of the vehicle operator. The software application does not send a message to the second user's device. The software application may display or otherwise provide a message to the first user explaining why the "Window down" button is deactivated.

Figure 25:
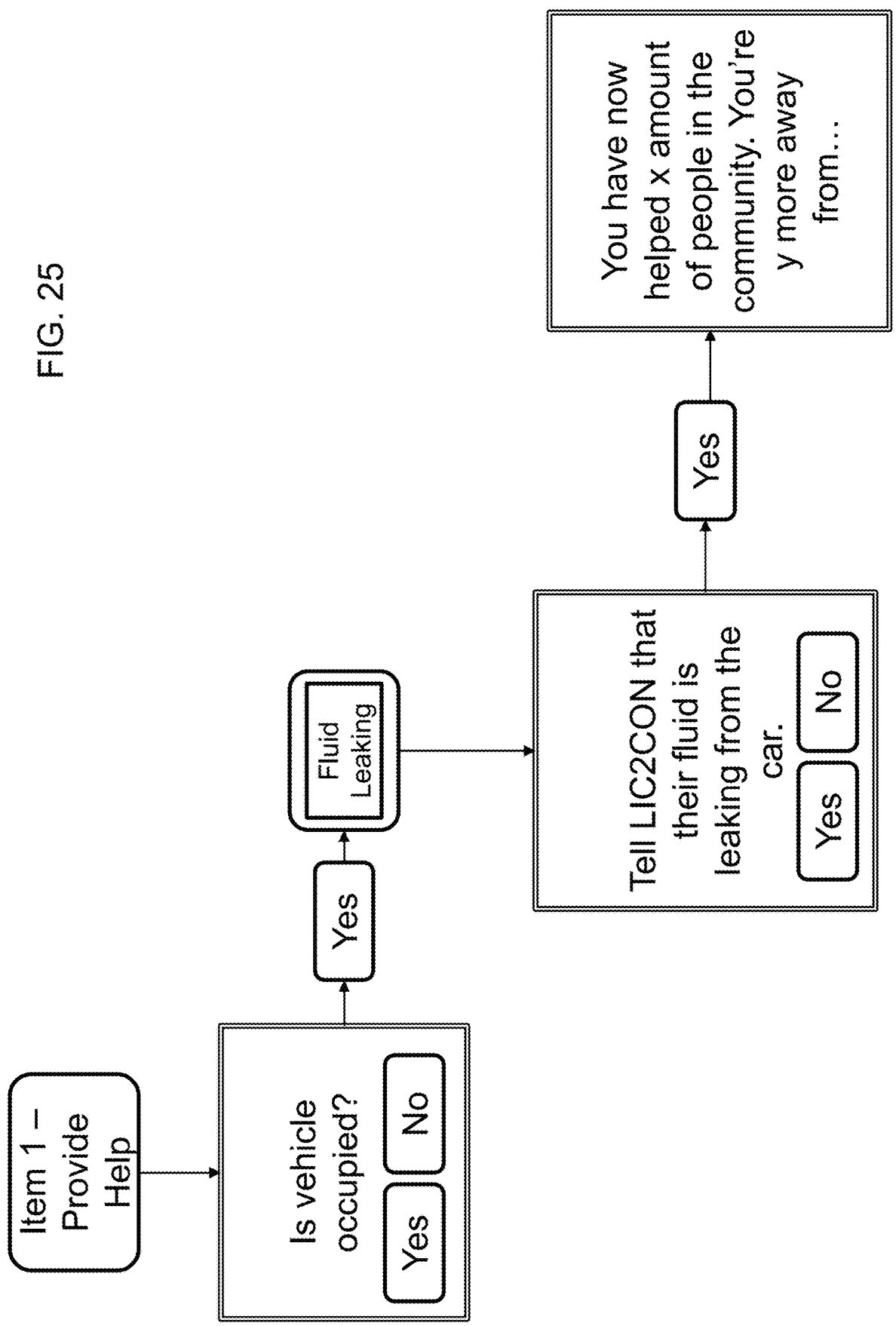

FIG. 25 illustrates a user interaction with the software application in a scenario in which the first user observes an occupied vehicle leaking fluid. The first user may click "Provide help" (see FIG. 1A), then click "Yes" in a pop-up screen that reads, "Is vehicle occupied?", then click "Fluid leaking" (see FIG. 1B), then click "Yes" in a pop-up screen that reads, "Tell the L2C user fluid is leaking from their car."

The software application sends the message to the second user's device via the software application. The software application may confirm receipt of the message. The software application may update account information of the first and/or second user.

The software application can further be configured to provide one or more additional features. The software application can be configured to display certain images via augmented reality to the user being notified (second user) can identify the issue and location of the vehicle. The software application can be in communication with a built in vehicle scanner; the vehicle scanner can be configured to automatically scan other vehicle (e.g. determine license plate number); and the software application can prompt the user to allow the user to interact with the scanned vehicle. The software application can be configured to display a personal message to another vehicle either directly to a vehicle display or a heads up windshield display. The software application can be configured to change colors and/or add text to a digital license plate. The software application can be configured to allow vehicles within a community to communicate with each other in real time. The software application can be configured to allow direct linkage between any registered vehicle and local government agency dispatcher. The software application can be configured to provide an augmented reality heads-up display within a vehicle in which other vehicles associated with registered users of the software application are visually indicated (e.g. by color, text, etc.).

Figure 26:
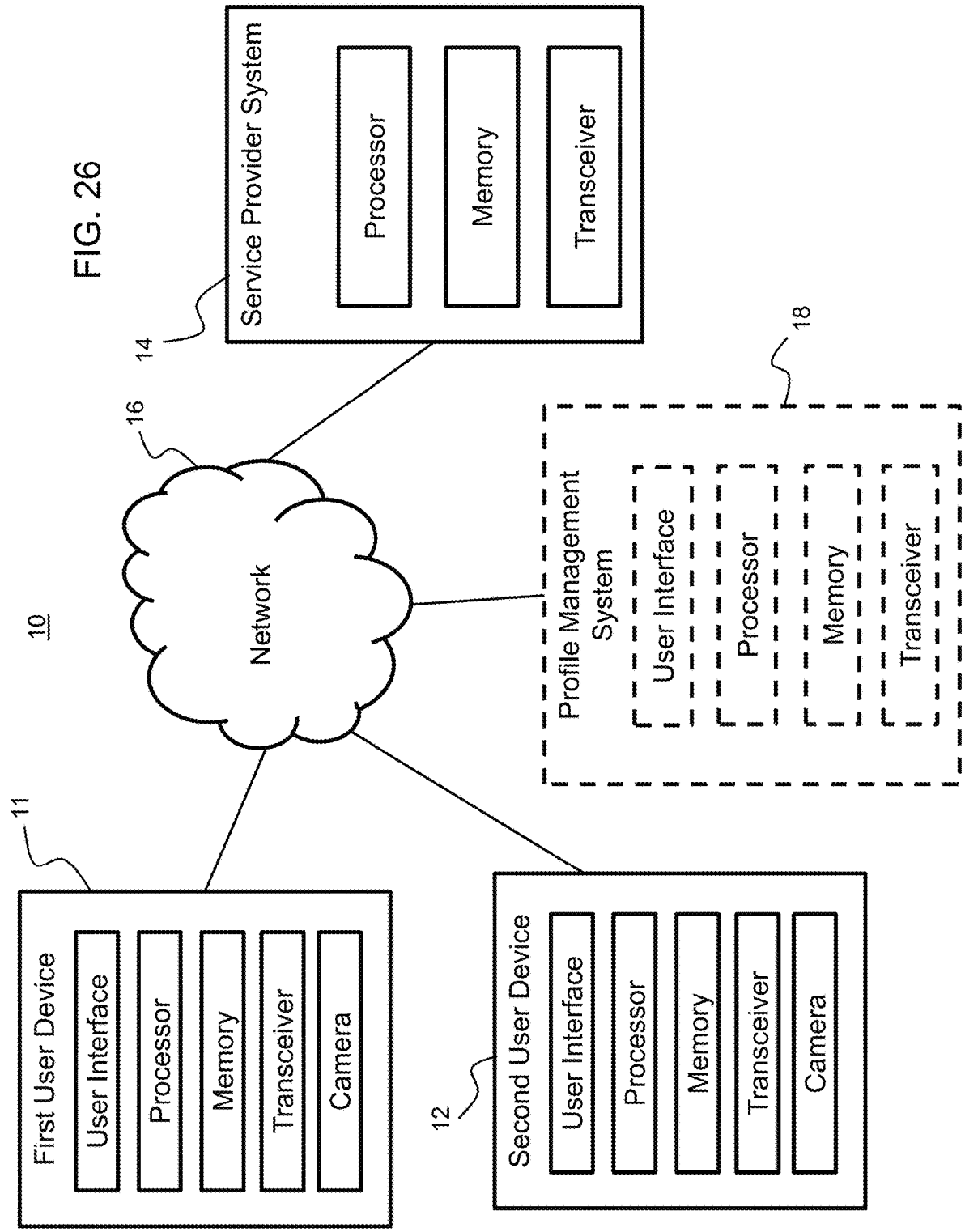
FIG. 26 is a block diagram of a computing system according to aspects of the present invention.

FIG. 26 is a block diagram of a computing system 10. In accordance with disclosed embodiments, system may include a service provider system 14 in communication with computing devices (first user device 11 and second user device 12) via a network 16. In some embodiments, the service provider system 14 may also be in communication with various databases. The first and second user devices may include a mobile computing devices (e.g., a smart phone, tablet computer, smart wearable device, portable laptop computer, voice command device, wearable augmented reality device, or other mobile computing device), a stationary device (e.g., desktop computer), or integral to a vehicle.

The network 16 may be of any suitable type, including individual connections via the internet such as cellular or Wi-Fi networks. In some embodiments, the network may connect terminals using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Each of the user devices 11, 12 can respectively include a user interface, a processor, a memory, and a transceiver. Each user device 11, 12 may also include a camera and other sensors to aid in identifying another vehicle and/or providing information related to an undesirable condition of the vehicle. The user interface can include the graphical user interface disclosed elsewhere herein with example snapshots illustrated in FIGS. 1A and 1B. The memory can be in communication with the processor and include instructions thereon, including at least a portion of the software application. The transceiver can be configured to communicate with the service provider system 14 and/or other similarly configured user devices via the network 16.

The service provider system 14 can include a processor, memory, and a transceiver. The memory can be in communication with the processor and include instructions thereon to receive and provide data to the user devices 11, 12 for use with software application on the respective user device 11, 12. The memory can also include instructions thereon to manage user account information.

The first user device 11 can have a first software application stored in memory. The first software application can store a first user profile of a first user. The second user device 12 can have a second software application stored in memory. The second software application can store a second user profile of a second user. Preferably, the first and second software applications are essentially identical except for the difference in user profiles and user settings of the respective applications. The first and second software applications may also include differences so that they can respectively be executed by different operating systems, may also have software version differences, etc. The first and second software systems can otherwise be configured to function together to provide services disclosed herein.

The service provider system 14 can be configured as a vehicle condition notification service provider system to facilitate communications between the first user device 11 and the second user device 12 as disclosed herein. The service provider system can be configured to receive a vehicle identification from the first user device 11, identify the second user profile as being associated with the vehicle identification, receive one or more predetermined selections related to vehicle condition from the first user device, and transmit a vehicle condition message to the second user device. The vehicle condition message can be based at least in part on one or more predetermined vehicle conditions selected by the first user via the first software application.

The vehicle identification can be input into the first user device by the first user using a user interface such as illustrated in FIGS. 1A and 1B. The first software application can provide an input field in the user interface of the first device for providing the vehicle identification. The software application can display predetermined selections related to a vehicle condition. The predetermined selections can relate to whether or not the vehicle is occupied. The predetermined selections can relate to at least one of: headlamp illumination, dome light on, trunk open, window down, door open, gas cap open, tire is flat, hit and run, water is rising, in the way, S.O.S., or fluid leaking. The first user can select one or more of the predetermined selections, and the first software application can receive this selection. The software application can then cause the first device to transmit information related to the selected predetermined selections to cause the second device to receive a vehicle alert message. Optionally, the first software application may allow the first user to select a specific alert message to send to the second user, such that the information transmitted by the first user and the alert message received by the second user are one in the same. The identity of the second user may remain anonymous to the first user and vice versa.

The second software application can be configured to store a second user profile associated with vehicle identification, and receive, from a third party system (e.g. first user device 11, or service provider system 14) an alert message based at least in part on a predetermined selection of the third party system. The predetermined selection can include one or more of the predetermined selections related to vehicle condition as disclosed herein, or other such predetermined selection as understood by a person skilled in the pertinent art. The second user device include a vehicle, however, to receive notifications when the vehicle is unoccupied, it is beneficial for the second user device to include a computing device separate from the vehicle such as a personal computer, tablet, or smartphone. In some examples, the second application can be configured such that a vehicle can receive an alert message and relay the alert message to a computing device separate from the vehicle.

Optionally, the computing system 10 can further include a profile management system 18 configured to manage registration of the first user profile and the second user profile with the service provider system 14. The profile management system can determine a closed group of users of the service provider system 14 and monitor alert messages for users in the closed group. The profile management system can have a profile management software application that controls which users of the service provider system 14 have access to being in the closed group and also receives some or all of the alert messages sent to members of the closed group. For instance, the profile management system can be managed by a homeowner's association, a corporate vehicle fleet operator, a police department, a vehicle safety organization, or other organization having similar needs that can be met by the computing system 10 as understood by a person skilled in the pertinent art.

Registration of a user profile with a profile management system 10 puts the user profile into a closed group, but the user of the user profile is not necessarily prohibited from sending or receiving vehicle condition alerts to users of the service provider system 14 that are outside of the closed group. The closed group is defined to allow the profile management system to monitor vehicle condition alerts received by and/or sent from users in the closed group to meet the needs of the group.

In the homeowner's association example, residences of the homeowner's association can each have respective user profiles with their vehicle identification associated with their profile, software applications on the user devices can notify the appropriate resident when an undesirable condition is present at a vehicle associated with their profile. Managers of the homeowner's association can extend invitations to new residents to join the closed group of users of the service provider system 14 and can receive information related to alerts sent and/or received by members of the closed group. The homeowner's association may also allow service providers such as maintenance personnel to have respective user profiles with respective vehicle identification. The homeowner's association may also require that visiting vehicles are registered under a temporary user profile in order to be allowed on the property. The temporary user profile can be registered using the service provider system 14 and/or by the residents themselves via an individual user profile. The temporary user profile can allow a time-limited access, by the service provider system 14, of notifications sent to and/or from the temporary user profile. The homeowner's association can take corrective action based on the information received from the profile management system 18 as appropriate, e.g. towing a vehicle, alerting police, etc.

In the corporate vehicle fleet example, users of vehicles in the fleet can each have respective user profiles, and the corporate vehicle fleet manager can set the vehicle identification of each respective user profile based on the vehicle assigned to the user by the vehicle fleet manager. Managers of the fleet can receive information related to alerts sent and/or received by members of the closed group via the profile management system 18 and initiate vehicle repairs or replacement as appropriate.

In the police department example, citizens can register their user profile to a profile management system 18 managed by a police department to act as a crowd-sourcing resource to the police department. Managers of the police department profile management system 18 can receive information related to alerts sent and/or received by members of the closed group via the profile management system 18. The police department can then respond to the alerts as appropriate.

In the vehicle safety example, citizens can register their user profile to a profile management system 18 managed by a non-profit, government, or other organization. Managers of the organization's profile management system 18 can receive information related to alerts sent and/or received by members of the closed group via the profile management system 18. The organization can then respond to the alerts as appropriate, e.g. collecting data for urban planning, alerting the police of unsafe conditions, etc.

The profile management system can include a processor, memory, and a transceiver. The profile management system may include a mobile computing device (e.g., a smart phone, tablet computer, smart wearable device, portable laptop computer, voice command device, wearable augmented reality device, or other mobile computing device), a stationary device (e.g., desktop computer), or integral to a vehicle. The profile management system 18 can include instructions stored in memory to run a software application configured to perform the functions of the profile management system 18 as disclosed herein, variations thereof, and alternatives thereto as understood by a person skilled in the pertinent art. The software application of the profile management system may optionally include features of the software applications of the user devices 11, 12.

The profile management system can be configured to receive from the first user device 11 a vehicle condition alert based at least in part on the one or more predetermined selections made by the first user. The vehicle condition alert may be transmitted from the first user device 11, to the service provider system 14, which may then transmit the vehicle condition alert to the second user device 12 and the profile management system 18.

The system 10 is illustrated such that the user devices 11, 12, profile management system 16, and service provider system 14, communicate via a network 16. Additionally, or alternatively, the user devices 11, 12, profile management system 16, and/or service provider system 14 can communicate directly with each other in any sub-combination as understood by a person skilled in the pertinent art.

The transceiver of the user devices 11, 12, profile management system 18, and/or the service provider system 14 may include a mobile network interface configured to provide access to a cellular network, the Internet, or another wide-area network. In some embodiments, a mobile network interface may include hardware, firmware, and/or software that allows processor(s) to communicate with other devices via wired or wireless networks, whether local or wide area, private or public, as known in the art. A power source may be configured to provide an appropriate alternating current (AC) or direct current (DC) to power components.

The service provider system 14 and/or profile management system 18 may configured to remotely communicate with one or more user devices 11, 12. According to some embodiments, service provider system 14 and/or profile management system 18 may utilize a NN, word embeddings, a Markov chain, or a probabilistic parser to translate one or more legal clauses from legalese to plain English.

Each processor may include one or more of a microprocessor, microcontroller, digital signal processor, co-processor or the like or combinations thereof capable of executing stored instructions and operating upon stored data. Each memory may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory.

Each processor may be one or more known processing devices, such as a microprocessor from the Pentium™ family manufactured by Intel™ or the Turion™ family manufactured by AMD™. Each processor may constitute a single core or multiple core processor that executes parallel processes simultaneously. For example, a processor may be a single core processor that is configured with virtual processing technologies. In certain embodiments, processor may use logical processors to simultaneously execute and control multiple processes. Each processor may implement virtual machine technologies, or other similar known technologies to provide the ability to execute, control, run, manipulate, store, etc. multiple software processes, applications, programs, etc. One skilled in the pertinent art understands that other types of processor arrangements could be implemented that provide for the capabilities disclosed herein.

The service provider system 14 and/or profile management system 18 may include one or more storage devices configured to store information used by processor (or other components) to perform certain functions related to the disclosed embodiments. In one example, the service provider system 14 and/or profile management system 18 may include memory that includes instructions to enable processor to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the service provider system 14 and/or profile management system 18 may include memory that includes instructions that, when executed by processor, perform one or more processes consistent with the functionalities disclosed herein. Methods, systems, and articles of manufacture consistent with disclosed embodiments are not limited to separate programs or computers configured to perform dedicated tasks. For example, the service provider system 14 and/or profile management system 18 may include memory that may include one or more programs to perform one or more functions of the disclosed embodiments. Moreover, processor may execute one or more programs located remotely from the service provider system. For example, the service provider system may access one or more remote programs, that, when executed, perform functions related to disclosed embodiments.

Each memory may include one or more memory devices that store data and instructions used to perform one or more features of the disclosed embodiments. Each memory may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by a processor, perform one or more processes consistent with the disclosed embodiments. In some embodiments, the memory may include an image processing database and a neural-network pipeline database for storing related data to enable service provider system to perform one or more of the processes and functionalities associated with the disclosed embodiments.

The service provider system 14 and/or profile management system 18 may also be communicatively connected to one or more memory devices (e.g., databases (not shown)) locally or through a network. The remote memory devices may be configured to store information and may be accessed and/or managed by the service provider system. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

The service provider system may 14 and/or profile management system 18 also include one or more I/O devices that may include one or more interfaces for receiving signals or input from devices and providing signals or output to one or more devices that allow data to be received and/or transmitted by service provider system. For example, service provider system 14 and/or profile management system 18 may include interface components, which may provide interfaces to one or more input devices, such as one or more keyboards, mouse devices, touch screens, track pads, trackballs, scroll wheels, digital cameras, microphones, sensors, and the like, that enable service provider system to receive data from one or more users (such as via computing device).

In example embodiments of the disclosed technology, the service provider system 14 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the user devices 11, 12 and the service provider system 14 and/or profile management system 18 have each respectively been described as one form for implementing the techniques described herein, those skilled in the pertinent art appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations may include a greater or lesser number of components than those illustrated.

Figure 27:
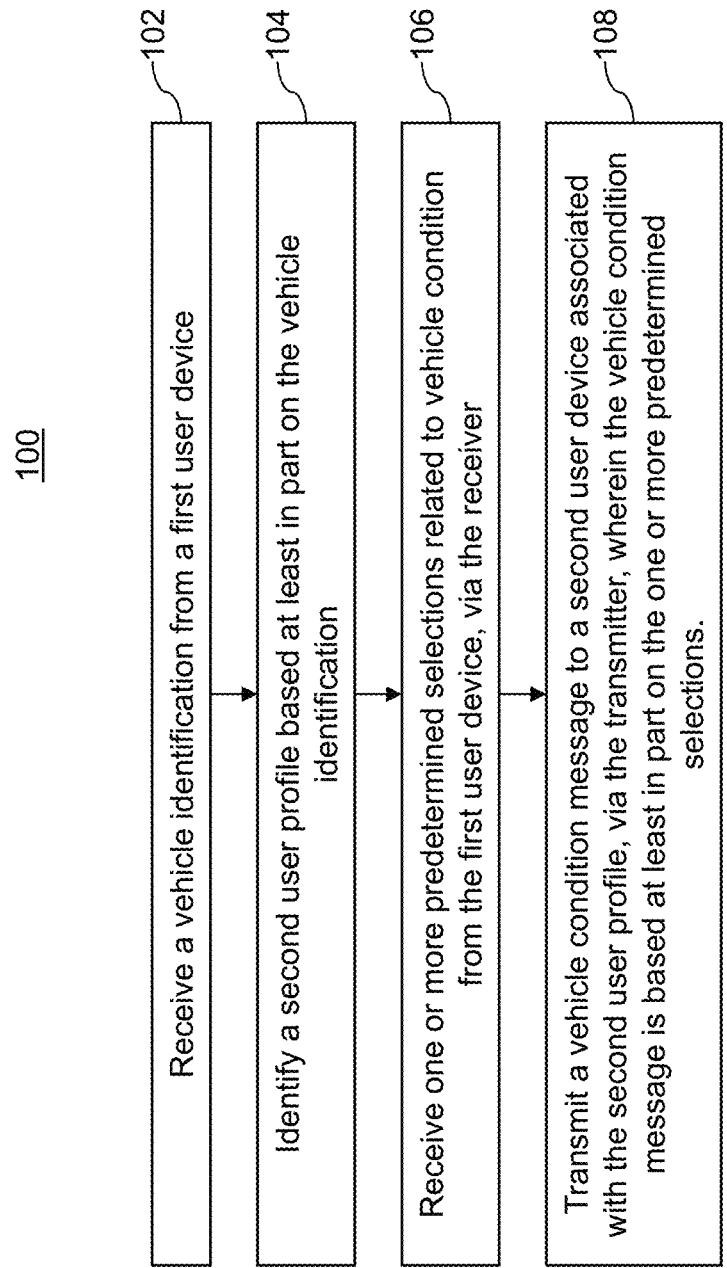
FIG. 27 is a flow diagram of a method that can be executed by a vehicle condition notification service provider system according to aspects of the present invention.

FIG. 27 is a flow diagram of a method that can be executed by a vehicle condition notification service provider system to receive information from a first user device and send information to a second user device related to an undesirable vehicle condition. The vehicle condition notification service provider system can be configured similarly to the service provider system 14 illustrated in FIG. 26, example service provides disclosed herein, alternatives thereto, and variations thereof as understood by a person skilled in the pertinent art. The first user device can be configured similar to the first user device 11 illustrated in FIG. 26, example user devices disclosed herein, alternatives thereto, and variations thereof as understood by a person skilled in the pertinent art. The second user device can be configured similar to the second user device 12 illustrated in FIG. 26, example user devices disclosed herein, alternatives thereto, and variations thereof as understood by a person skilled in the pertinent art.

At step 102, a vehicle identification message is received from the first user device.

At step 104, a second user profile is identified based at least in part on the vehicle identification.

At step 106, one or more predetermined selections related to vehicle condition from the first user device is received.

At step 108, a vehicle condition message can be transmitted to the second user device. The second user device can be associated with a second user profile. The vehicle condition message can be based at least in part on the one or more predetermined selections received at step 106.

Figure 28:
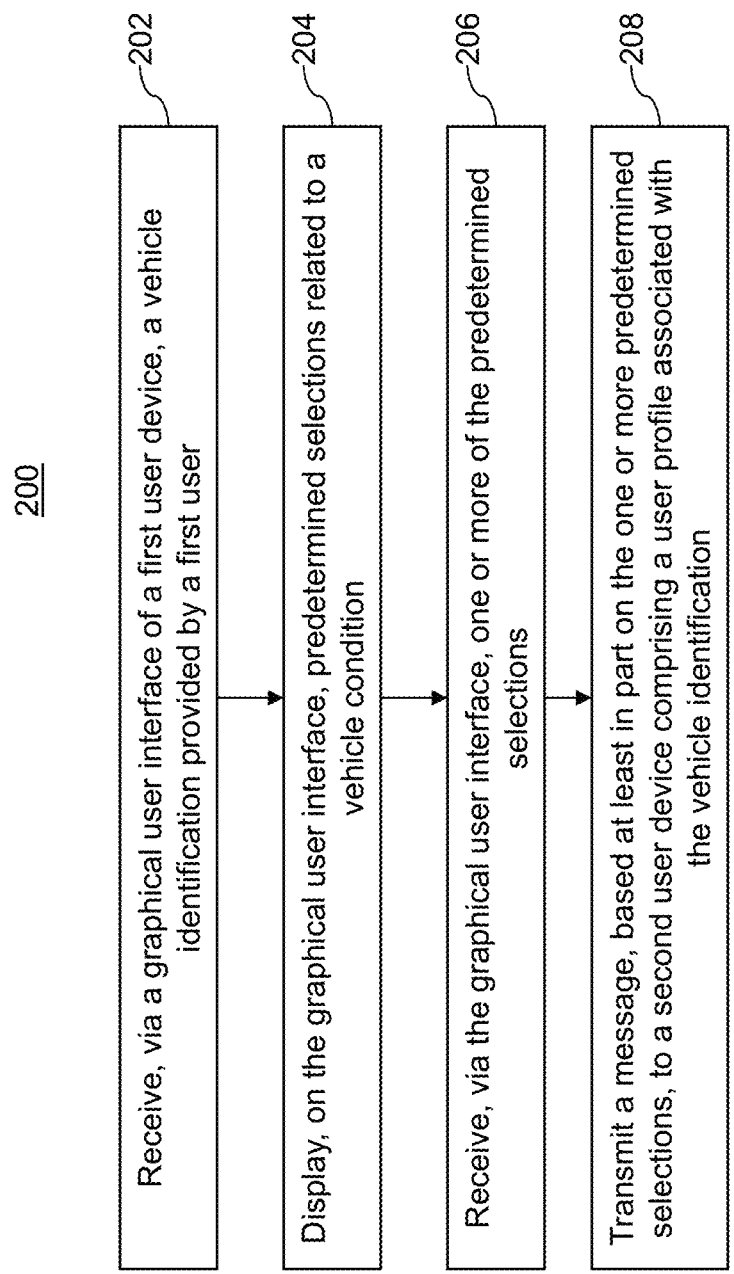
FIG. 28 is a flow diagram of a method that can be executed by a first user device to send a vehicle alert to a second user device according to aspects of the present invention.

FIG. 28 is a flow diagram of a method 200 that can be executed by a first user device to send a vehicle alert to a second user device. The first user device can be configured similar to the first user device 11 illustrated in FIG. 26, example user devices disclosed herein, alternatives thereto, and variations thereof as understood by a person skilled in the pertinent art. The second user device can be configured similar to the second user device 12 illustrated in FIG. 26, example user devices disclosed herein, alternatives thereto, and variations thereof as understood by a person skilled in the pertinent art.

At step 202, a vehicle identification provided by a first user can be received via a graphical user interface of a first user device.

At step 204, predetermined selections related to a vehicle condition can be displayed on the graphical user interface.

At step 206, one or more of the predetermined selections can be received via the graphical user interface.

At step 208, a message can be transmitted to a second user device. The message can be based at least in part on the one or more predetermined selections received at step 206. The second user device can include a user profile associated with the vehicle identification received at step 202.

Figure 29:
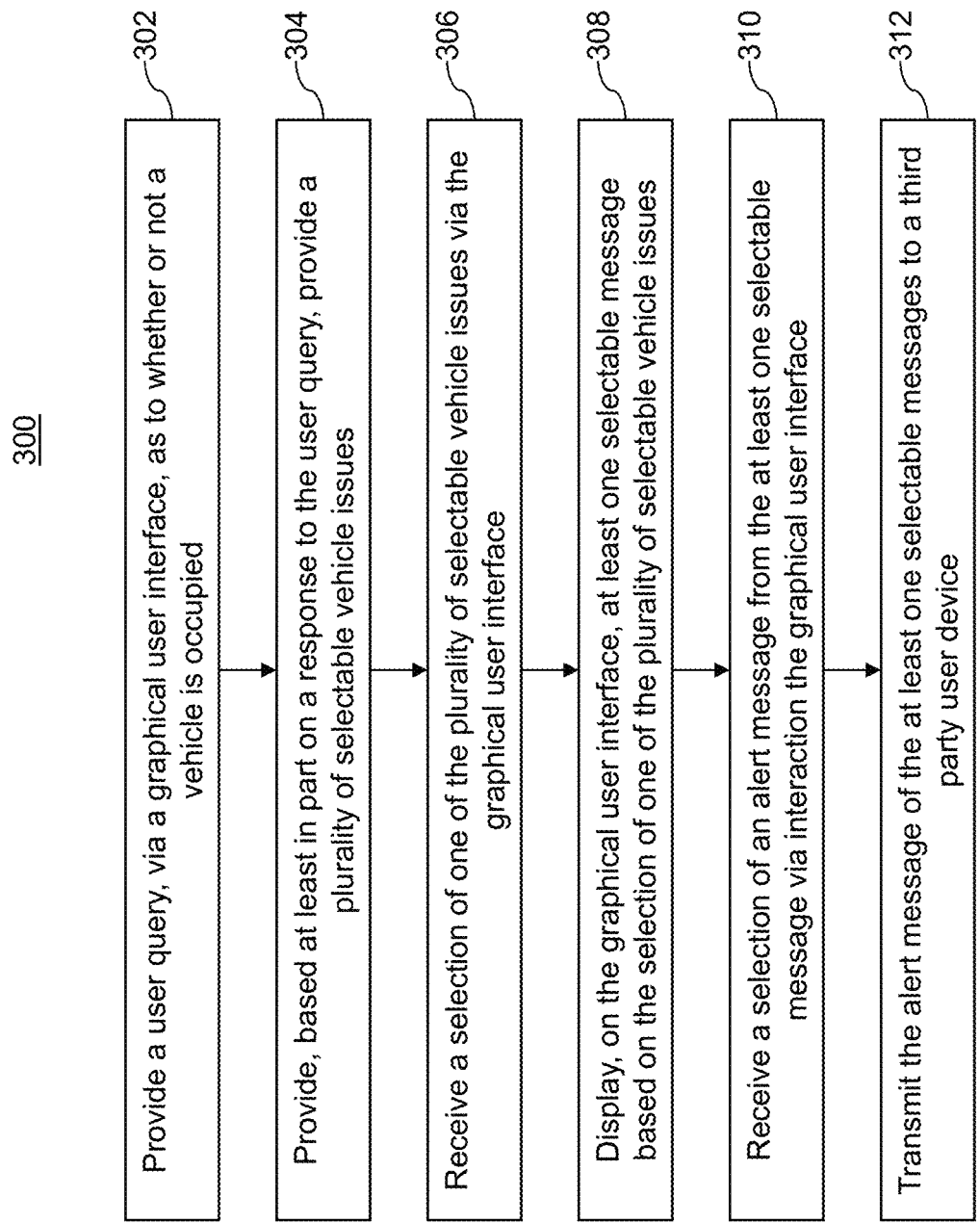
FIG. 29 is a flow diagram of a method that can be executed by a first user device to send a vehicle alert to a second user device according to aspects of the present invention.

FIG. 29 is a flow diagram of a method 300 that can be executed by a first user device to send a vehicle alert to a second user device. The first user device can be configured similar to the first user device 11 illustrated in FIG. 26, example user devices disclosed herein, alternatives thereto, and variations thereof as understood by a person skilled in the pertinent art. The second user device can be configured similar to the second user device 12 illustrated in FIG. 26, example user devices disclosed herein, alternatives thereto, and variations thereof as understood by a person skilled in the pertinent art.

At step 302, a user query as to whether or not the vehicle is occupied is provided to a user via a graphical user interface.

At step 304, a plurality of selectable vehicle issues are provided based at least in part on a response to the user query.

At step 306, a selection of one of the plurality of selectable vehicle issues is received via the graphical user interface.

At step 308, at least one selectable message is displayed on the display. The displayed message(s) can be based, at least in part, on the selection of the one of the plurality of selectable vehicle issues.

At step 310, a selection of an alert message is received via interaction from the graphical user interface.

At step 312, the alert message is transmitted to a third party user device. The alert message can include the alert message selected at step 310. The third party user device can be separate from a sending device that sends the alter message. For instance, the third party user device can include the second user device, and the sending device can include the first user device.

Figure 30:
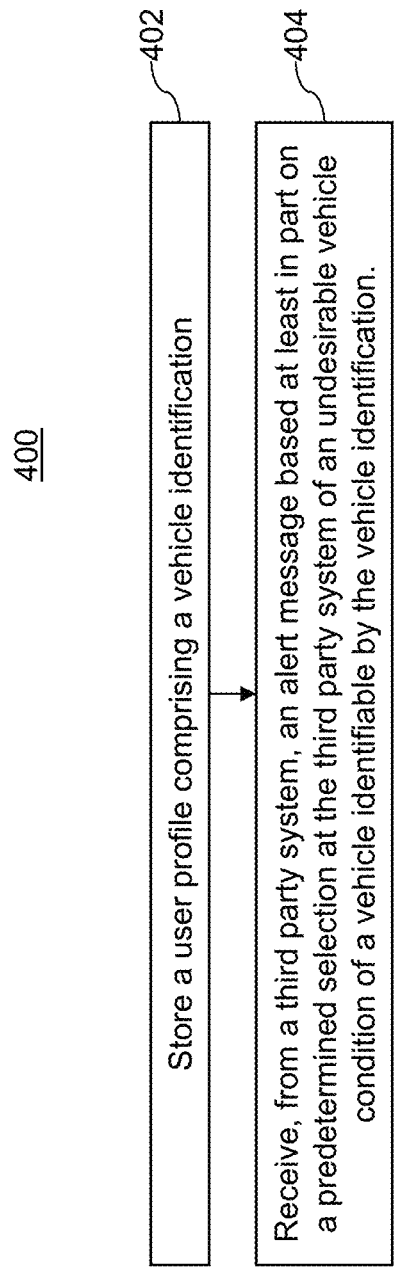
FIG. 30 is a flow diagram of a method that can be executed by a second user device to receive a vehicle alert from a third party such as a first user device, service provider system, or other third party according to aspects of the present invention.

FIG. 30 is a flow diagram of a method 400 that can be executed by a second user device to receive a vehicle alert from a third party such as a first user device, service provider system, or other third party. The second user device can be configured similar to the second user device 12 illustrated in FIG. 26, example user devices disclosed herein, alternatives thereto, and variations thereof as understood by a person skilled in the pertinent art.

At step 402, a user profile having a vehicle identification is stored.

At step 404, an alert message is received from a third party system. The alert message can be based at least in part on a predetermined selection at the third party system of an undesirable vehicle condition of a vehicle identifiable by the vehicle identification.

FIGS. 31 through 42 are screen shots of an example mobile device application that features several aspects of the present invention. The example mobile device is presented as a non-limiting example. Specific screen layouts and field entries can be modified to achieve the functionality presented as understood by a person skilled in the pertinent art.

Figure 31:
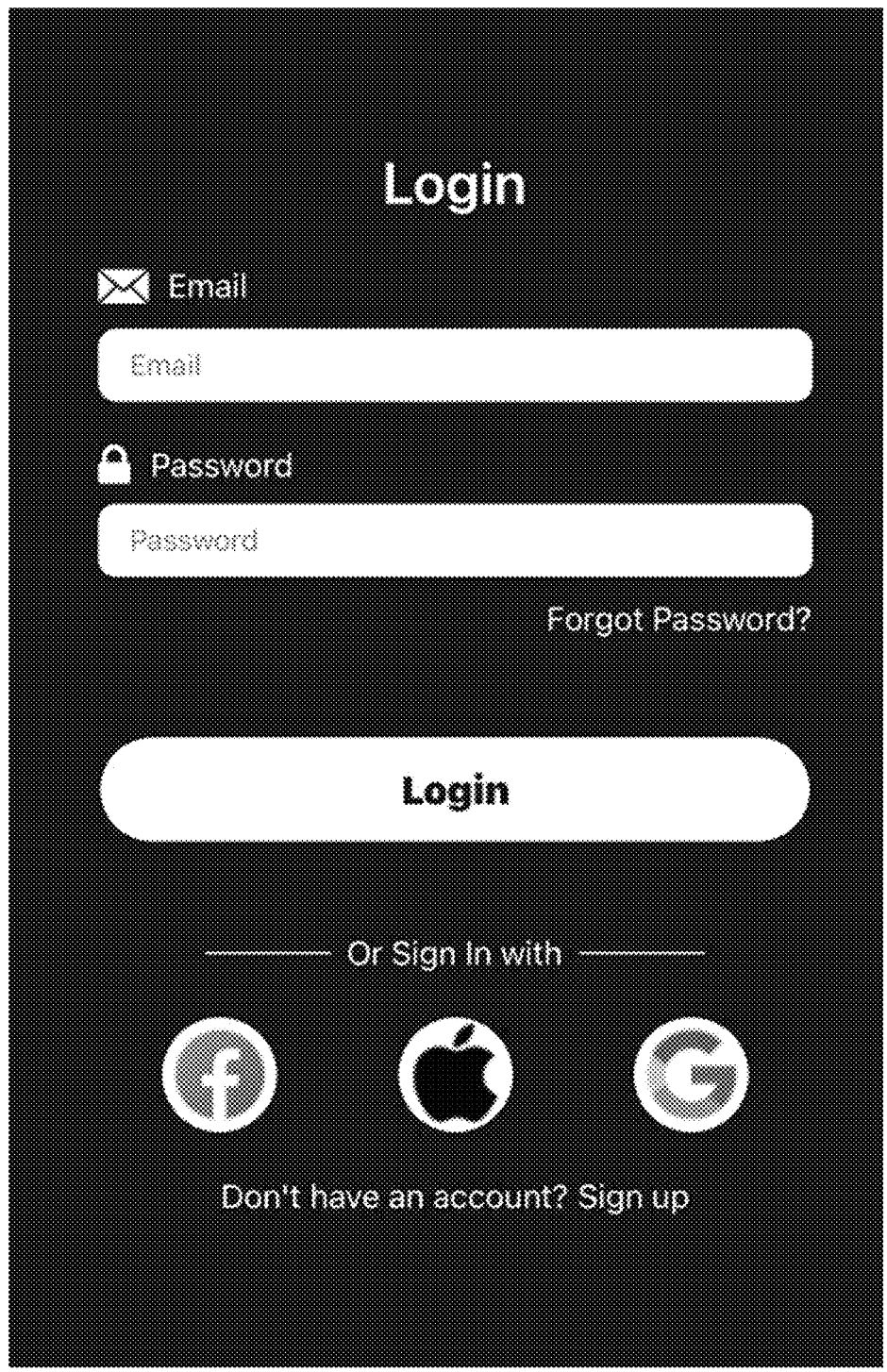
FIG. 31 is a screen shot of a login screen of an example mobile device application according to aspects of the present invention.

FIG. 31 is a screen shot of a login screen of an example mobile device application.

Figure 32:
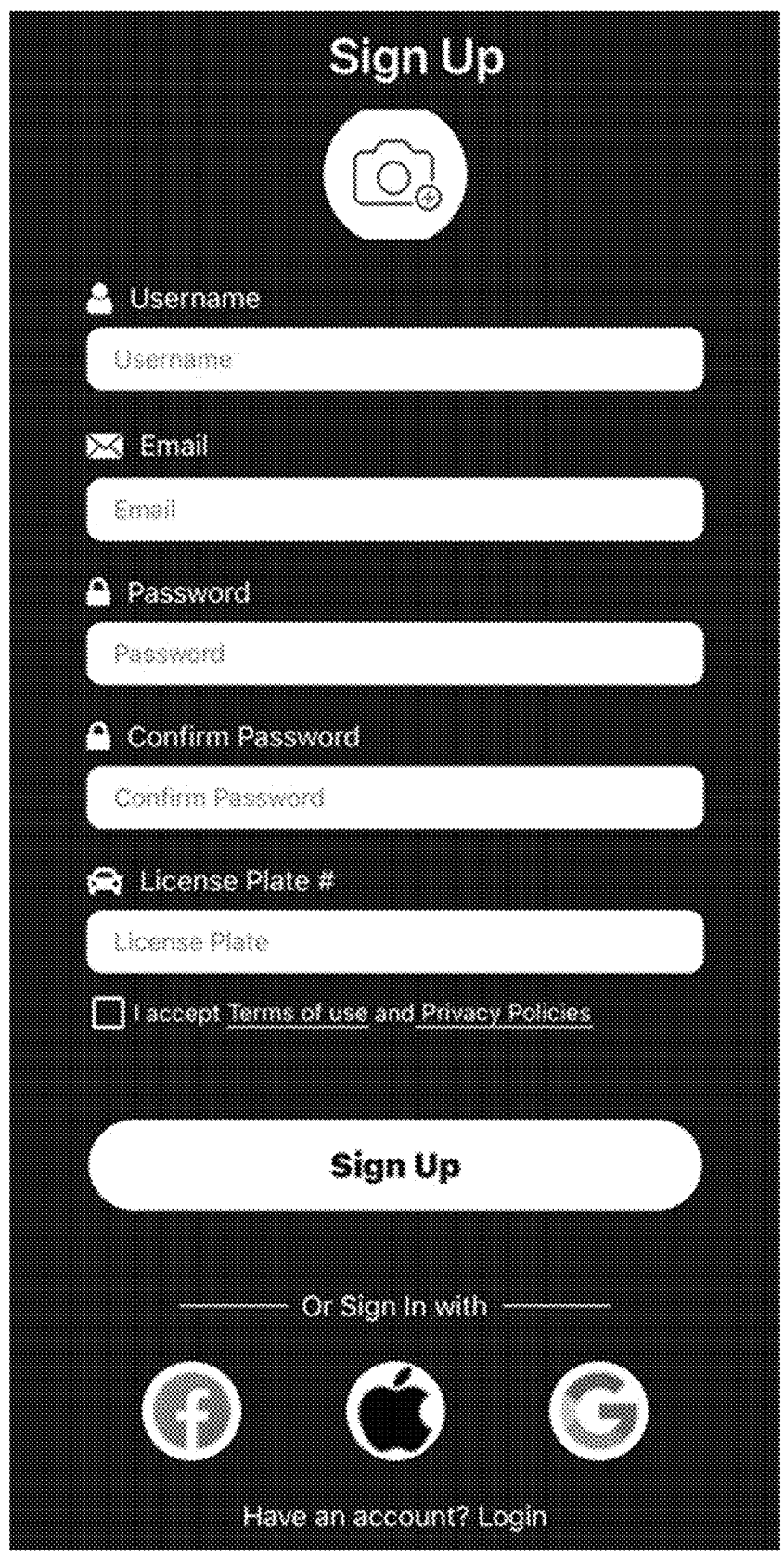
FIG. 32 is a screen shot of a sign up screen of an example mobile device application according to aspects of the present invention.

FIG. 32 is a screen shot of a sign up screen of an example mobile device application. The sign up screen includes a field where a license plate number can be entered. The license plate number is an example of a vehicle identification. Numerous alternatives may be possible to use in place of the license plate number, including examples disclosed herein, variations thereof, and alternatives thereto as understood by a person skilled in the pertinent art.

Figure 33:
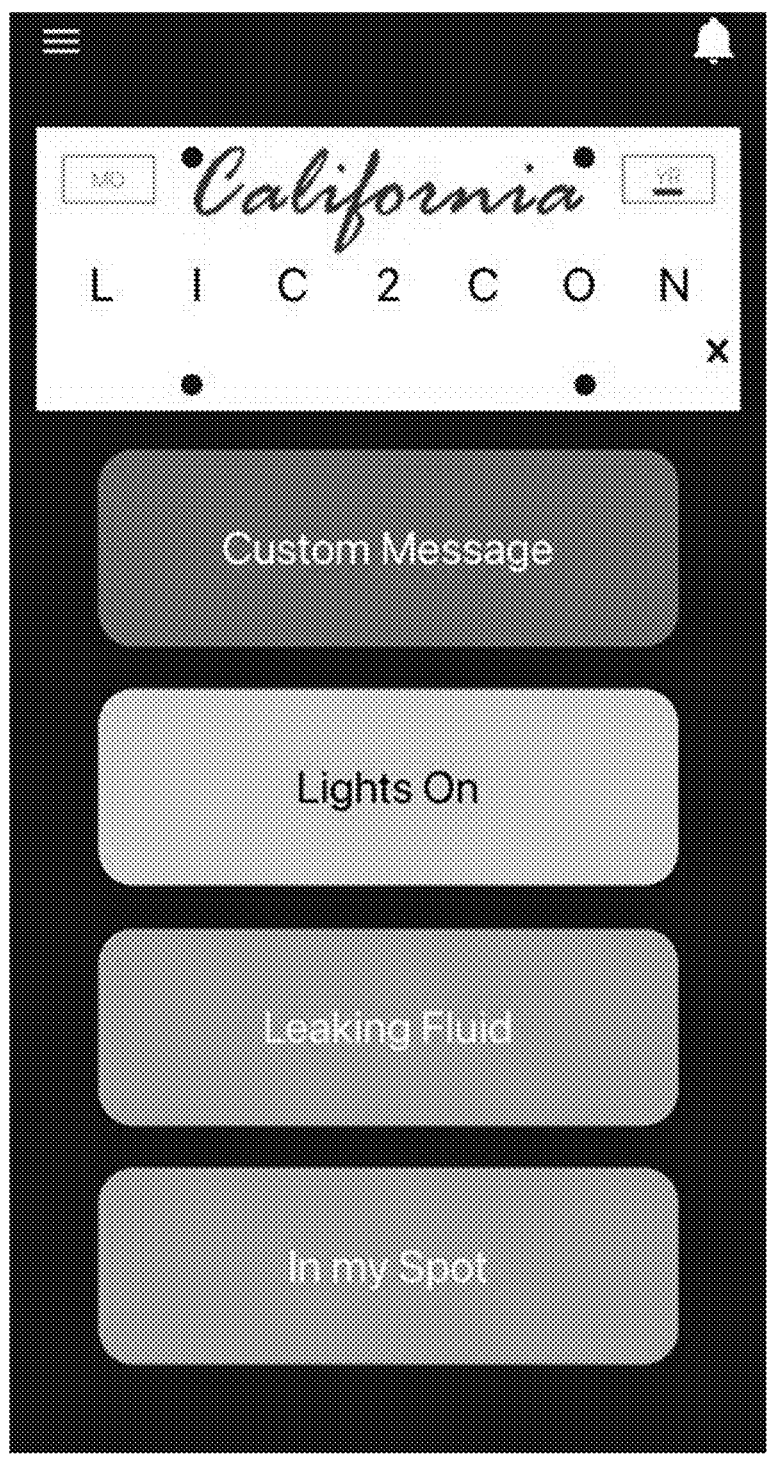
FIG. 33 is a screen shot of a vehicle condition message selection screen of an example mobile device application according to aspects of the present invention.

FIG. 33 is a screen shot of a vehicle condition message selection screen of an example mobile device application. The vehicle condition message selection screen offers predetermined selections including "Lights On", "Leaking Fluid", and "In my Spot". The predetermined selections can include additional or alternative messages including example predetermined messages presented herein, variations thereof, and alternatives thereto as understood by a person skilled in the pertinent art. The vehicle condition message selection screen also provides for a custom message selection option. The vehicle identification (license plate) of the third party vehicle can optionally be displayed on the vehicle condition message selection screen as illustrated in this example.

Figure 34:
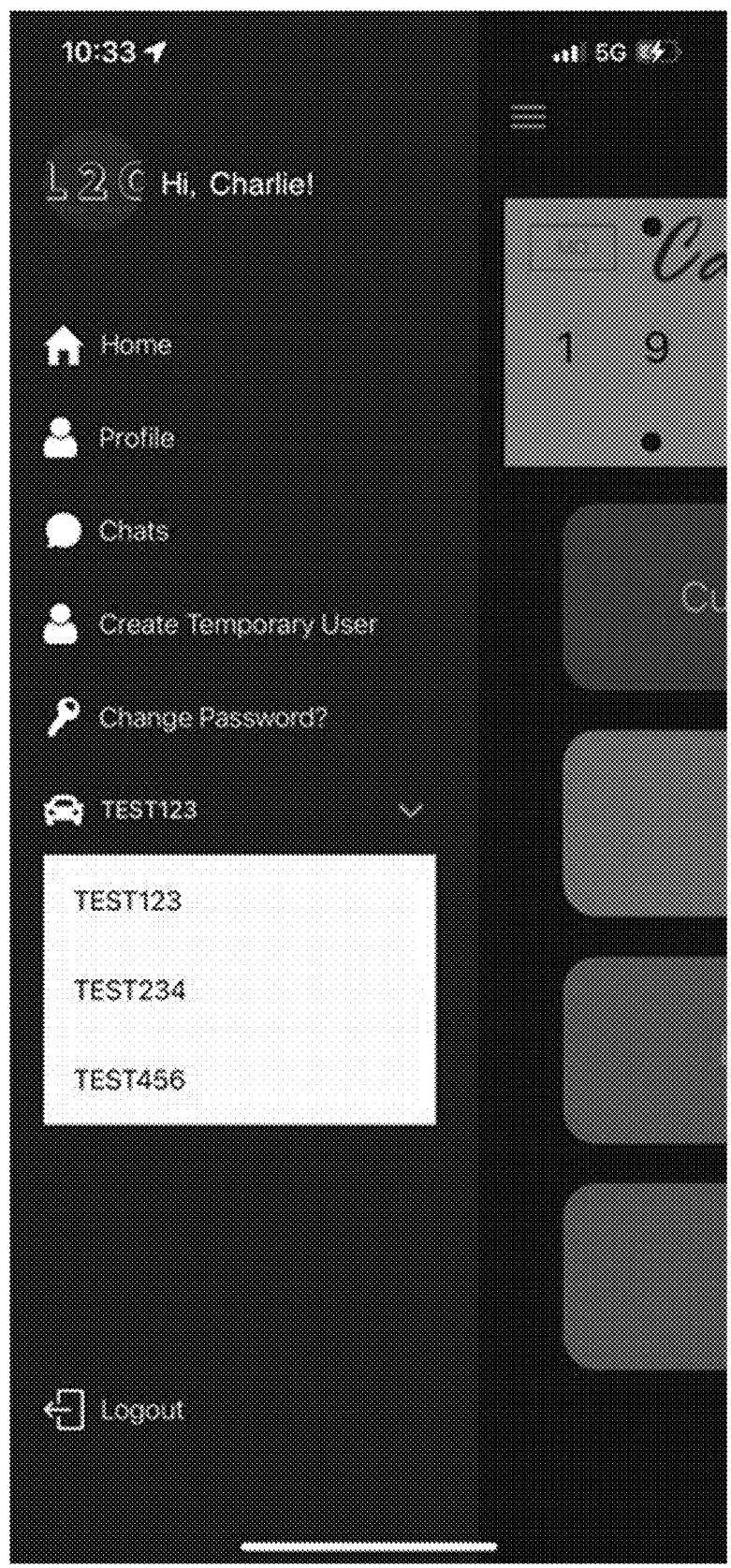
FIG. 34 is a screen shot of a screen displaying a menu tab of an example mobile device application according to aspects of the present invention.

FIG. 34 is a screen shot of a screen displaying a menu tab of an example mobile device application. The menu tab can be access by tapping the three bars on the upper left corner of certain screens such as the vehicle condition message selection screen illustrated in FIG. 33. The menu tab includes a welcome greeting, a link to a home screen, a link to a profile screen, a link to chats, a link to a temporary user creation screen, a link to a change password screen, and an indication of an active vehicle identification. The user profile can optionally store multiple vehicle identifications as illustrated in this example. The active vehicle identification can be selected with a drop down menu as illustrated in this example.

Figure 35:
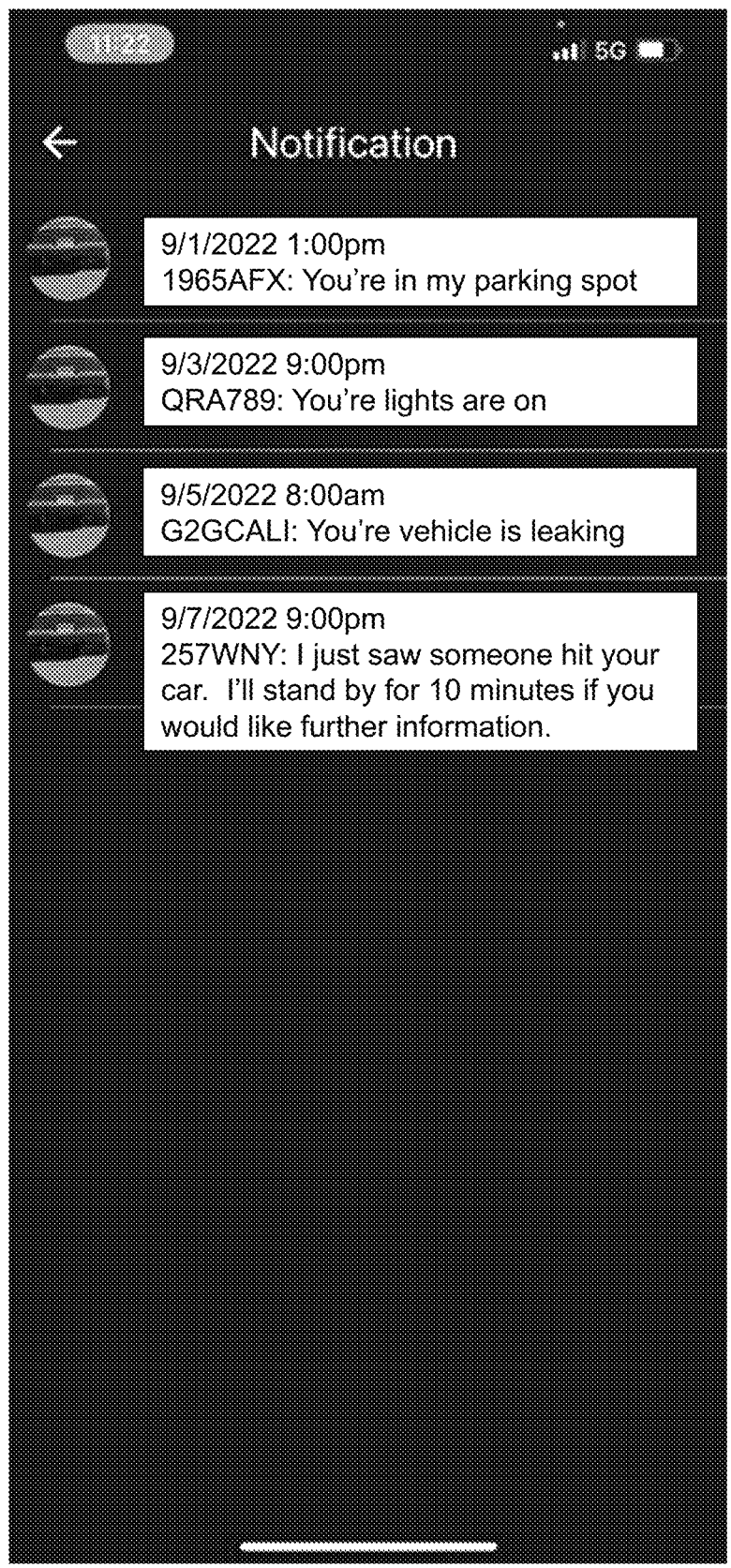
FIG. 35 is a screen shot of a notification screen of an example mobile device application according to aspects of the present invention.

FIG. 35 is a screen shot of a notification screen of an example mobile device application. The notification screen includes a list of notifications from other user profiles. Each notification indicate date and time, an active vehicle identification of the sender's user profile, and a message. The sender's user profile remains anonymous to the recipient of the notifications. The active vehicle identification of the sender's user profile is optional in the notification.

Figure 36:
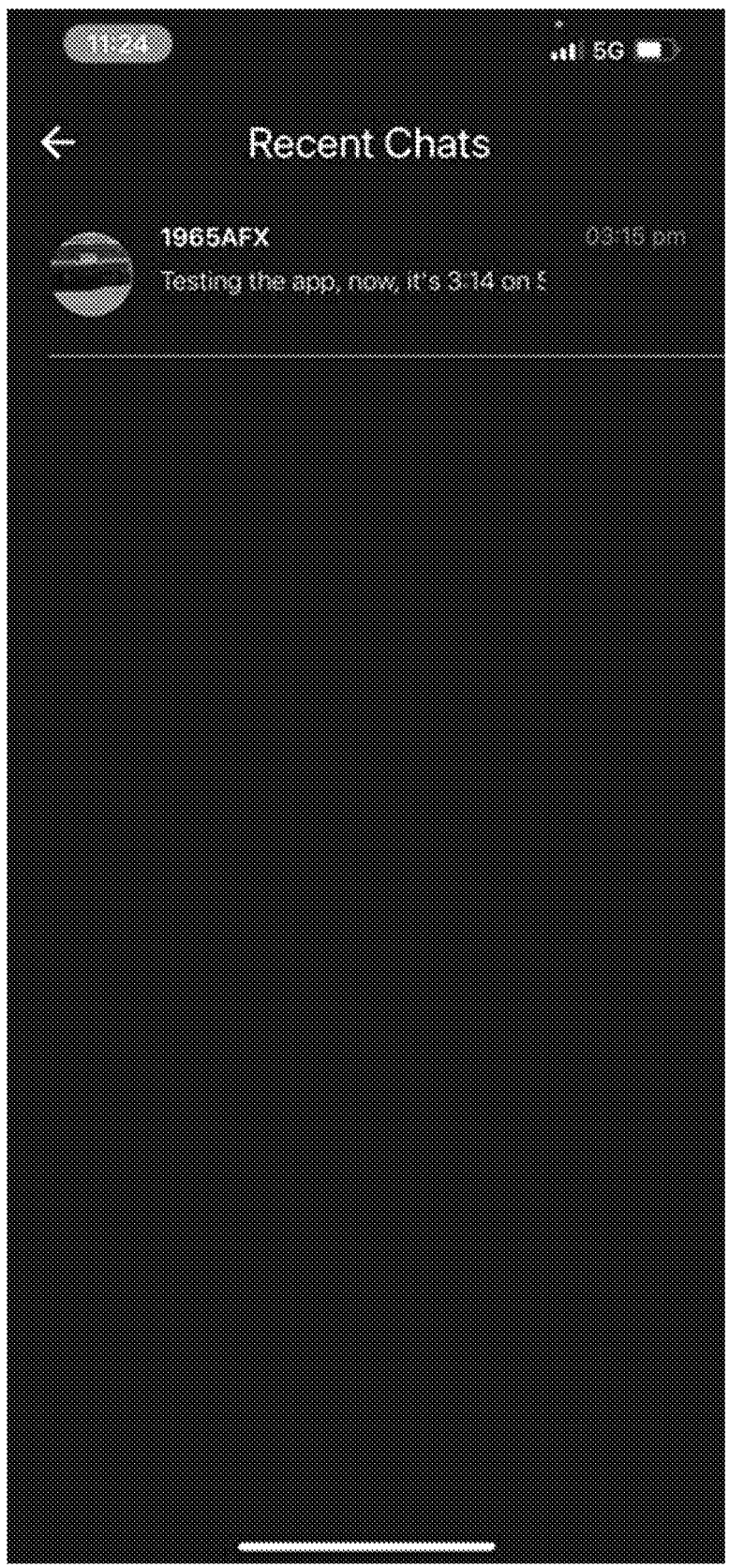
FIG. 36 is a screen shot of a chat screen of an example mobile device application according to aspects of the present invention.

FIG. 36 is a screen shot of a chat screen of an example mobile device application. The chat screen includes messages non-related to vehicle notifications. Each message indicates date and time, an active vehicle identification of the sender's user profile, and a message. Messages can be sent between members of a closed group, or user profiles that have followed each other, friended each other, or otherwise connected through the mobile app. Additionally, or alternatively, messages can be sent between any users of the mobile app. For instance, a Jeep trail riding enthusiast may spot a parked, unoccupied Jeep (at work, in neighborhood, etc.), enter the vehicle identification of that Jeep (e.g. license plate number) and send a message to the Jeep owner inviting them to join a trail riding group.

Figure 37:
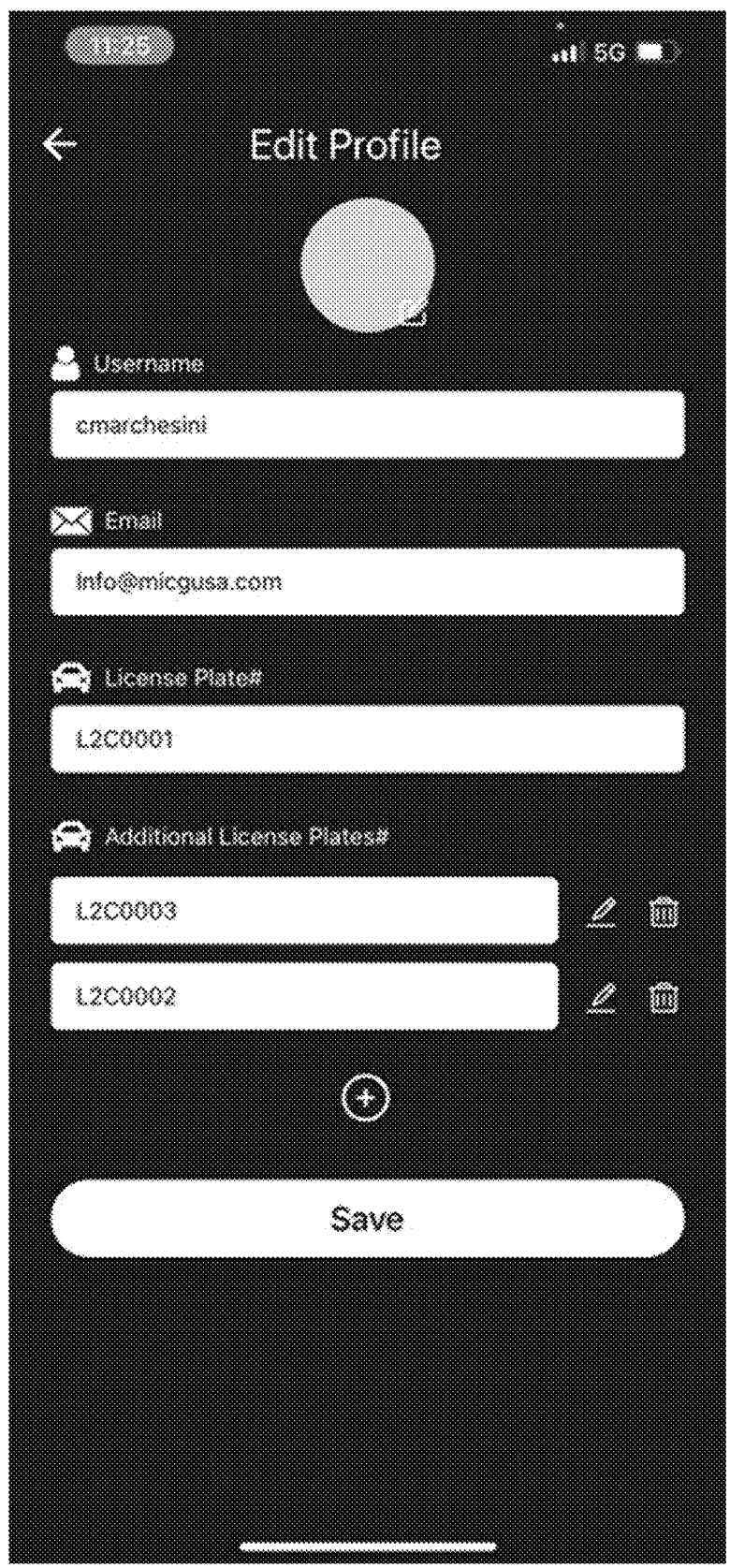
FIG. 37 is a screen shot of a user profile editing screen of an example mobile device application according to aspects of the present invention.

FIG. 37 is a screen shot of a user profile editing screen of an example mobile device application. Fields include a username, email, license plate number, and additional license plate numbers.

Figure 38:
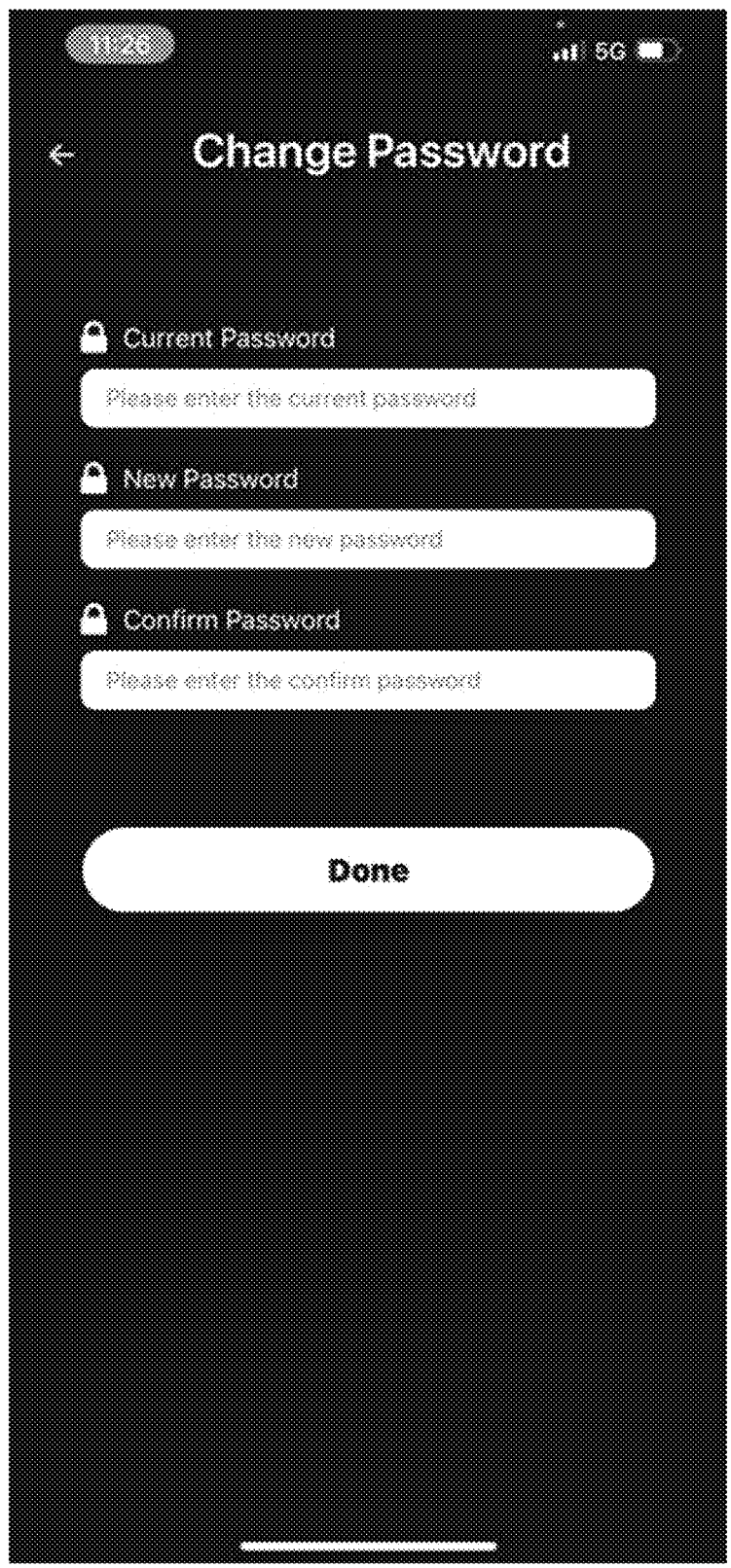
FIG. 38 is a screen shot of a change password screen of an example mobile device application according to aspects of the present invention.

FIG. 38 is a screen shot of a change password screen of an example mobile device application.

Figure 39:
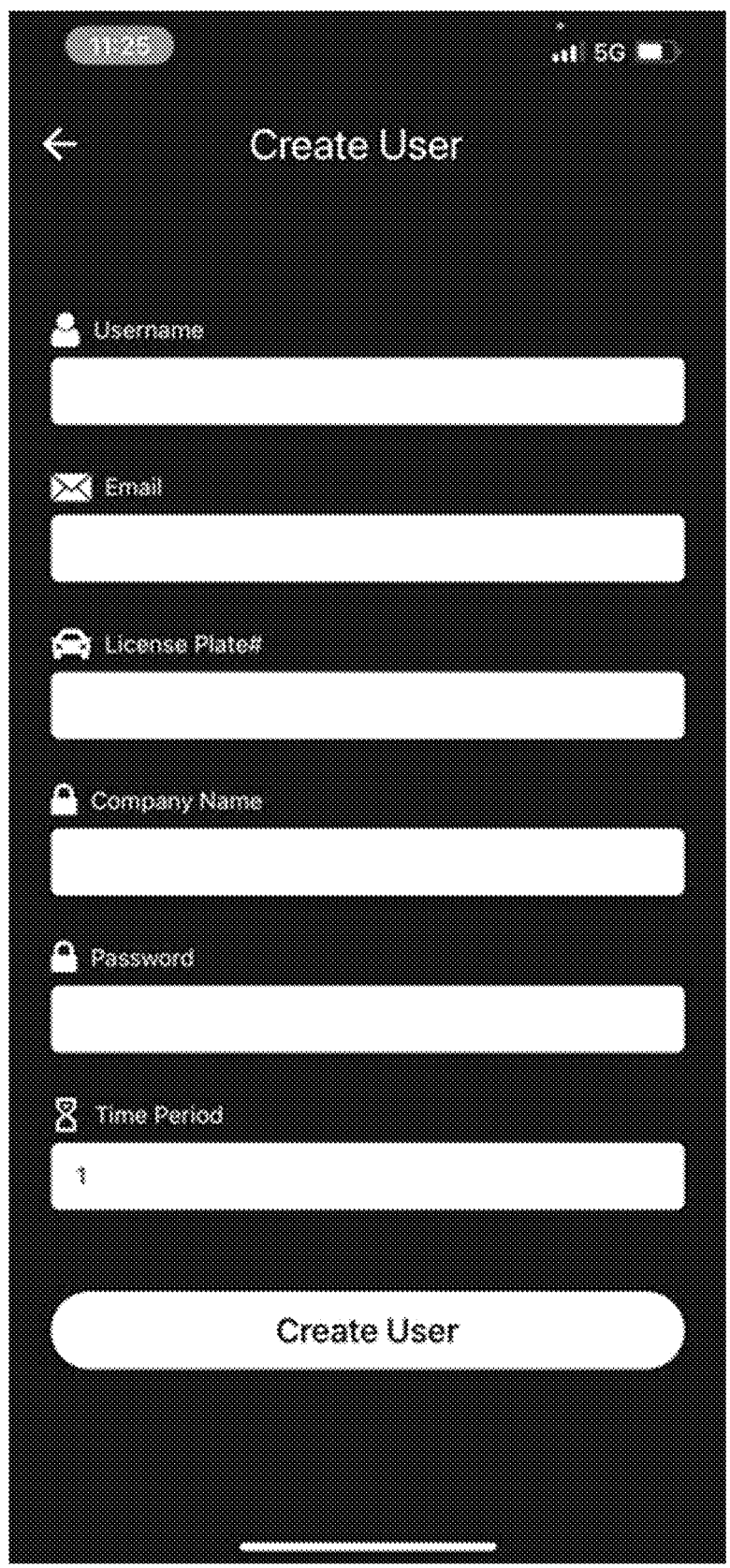
FIG. 39 is a screen shot of a create user screen of an example mobile device application according to aspects of the present invention.

FIG. 39 is a screen shot of a create user screen of an example mobile device application. Fields include a username, email, license plate, company name, password, and time period. The create user screen can be used to create a temporary user as disclosed elsewhere herein.

Figure 40:
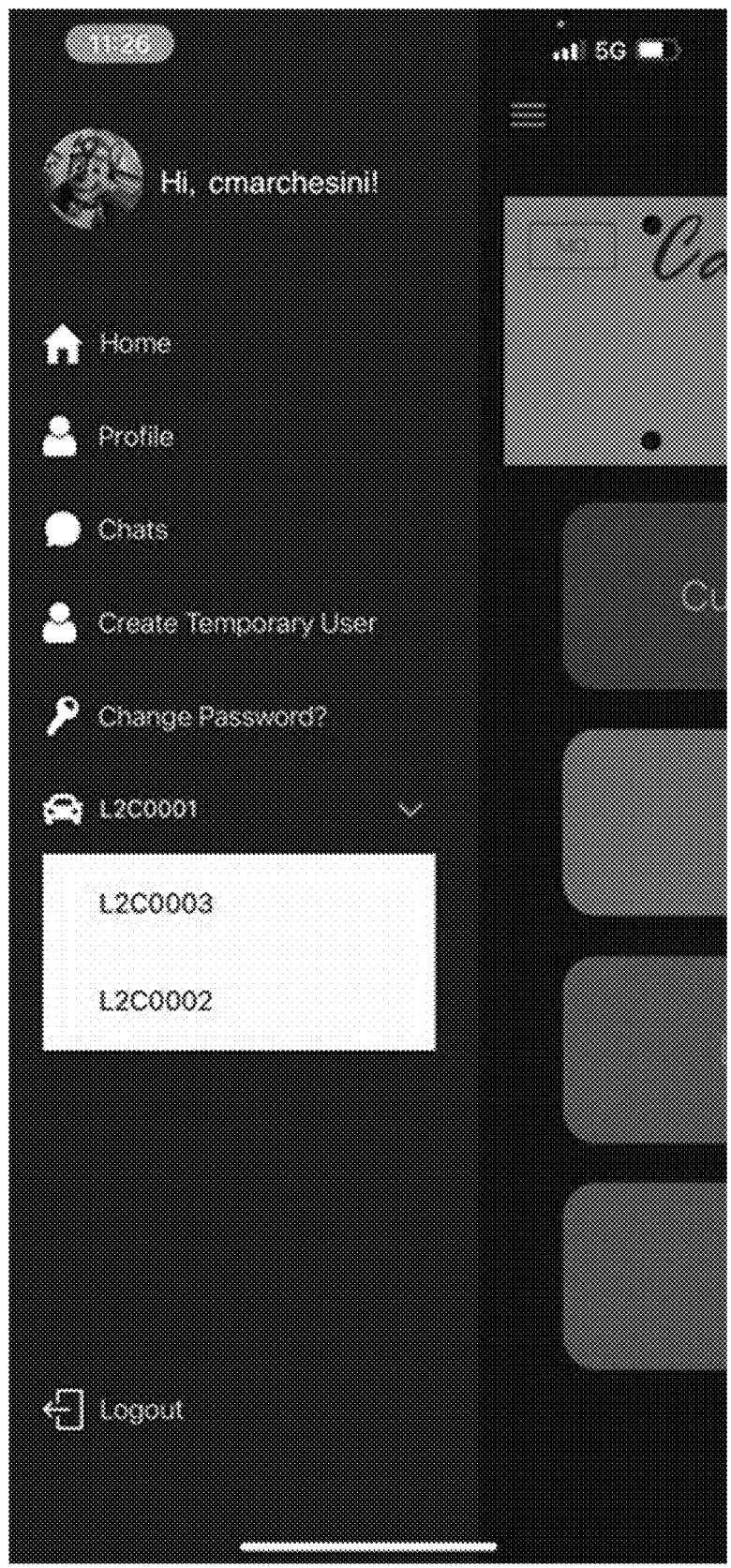
FIG. 40 is a screen shot of a screen displaying a menu tab of an example mobile device application according to aspects of the present invention.

FIG. 40 is a screen shot of a screen displaying a menu tab of an example mobile device application.

Figure 41:
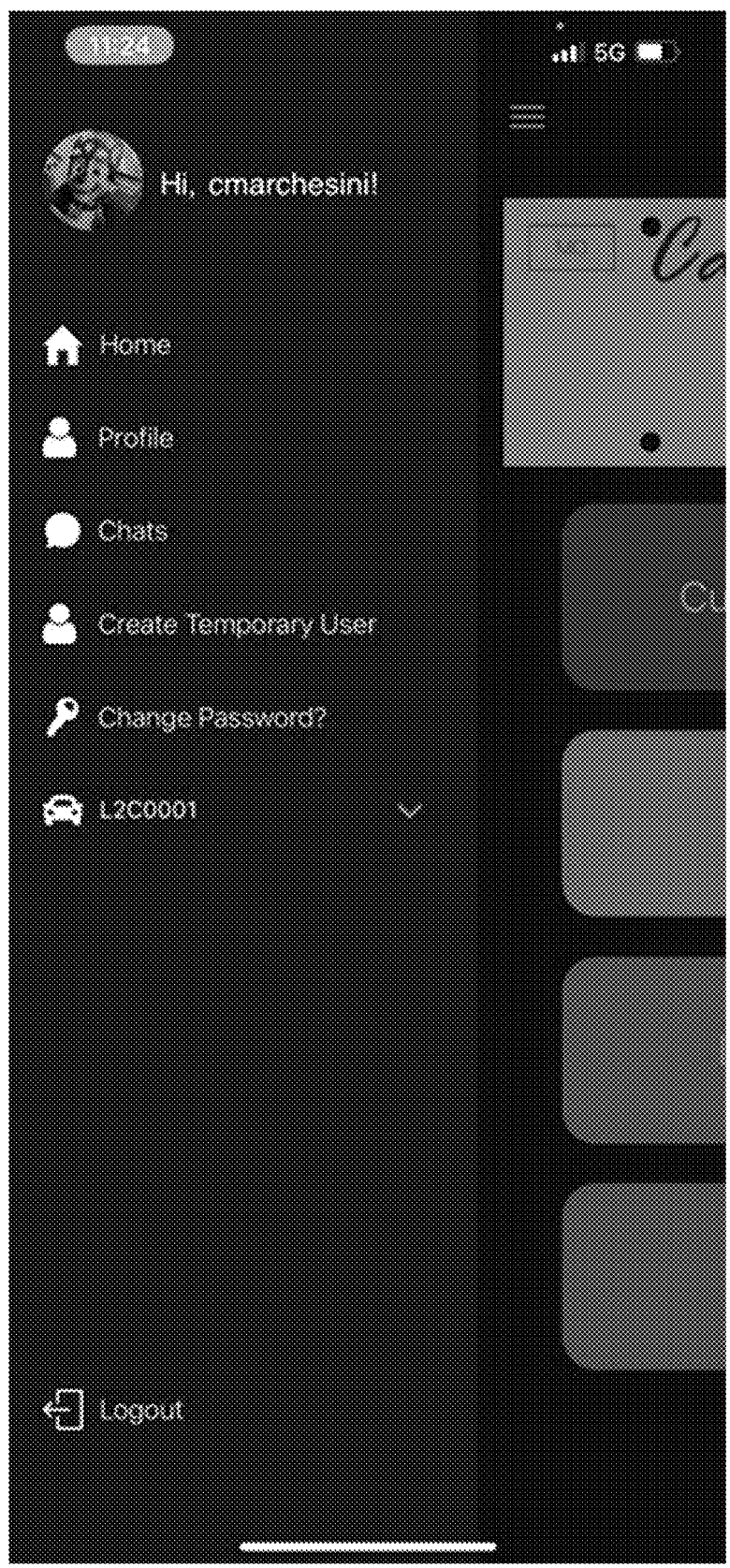
FIG. 41 is a screen shot of a screen displaying a menu tab of an example mobile device application according to aspects of the present invention.

FIG. 41 is a screen shot of a screen displaying a menu tab of an example mobile device application.

Figure 42:
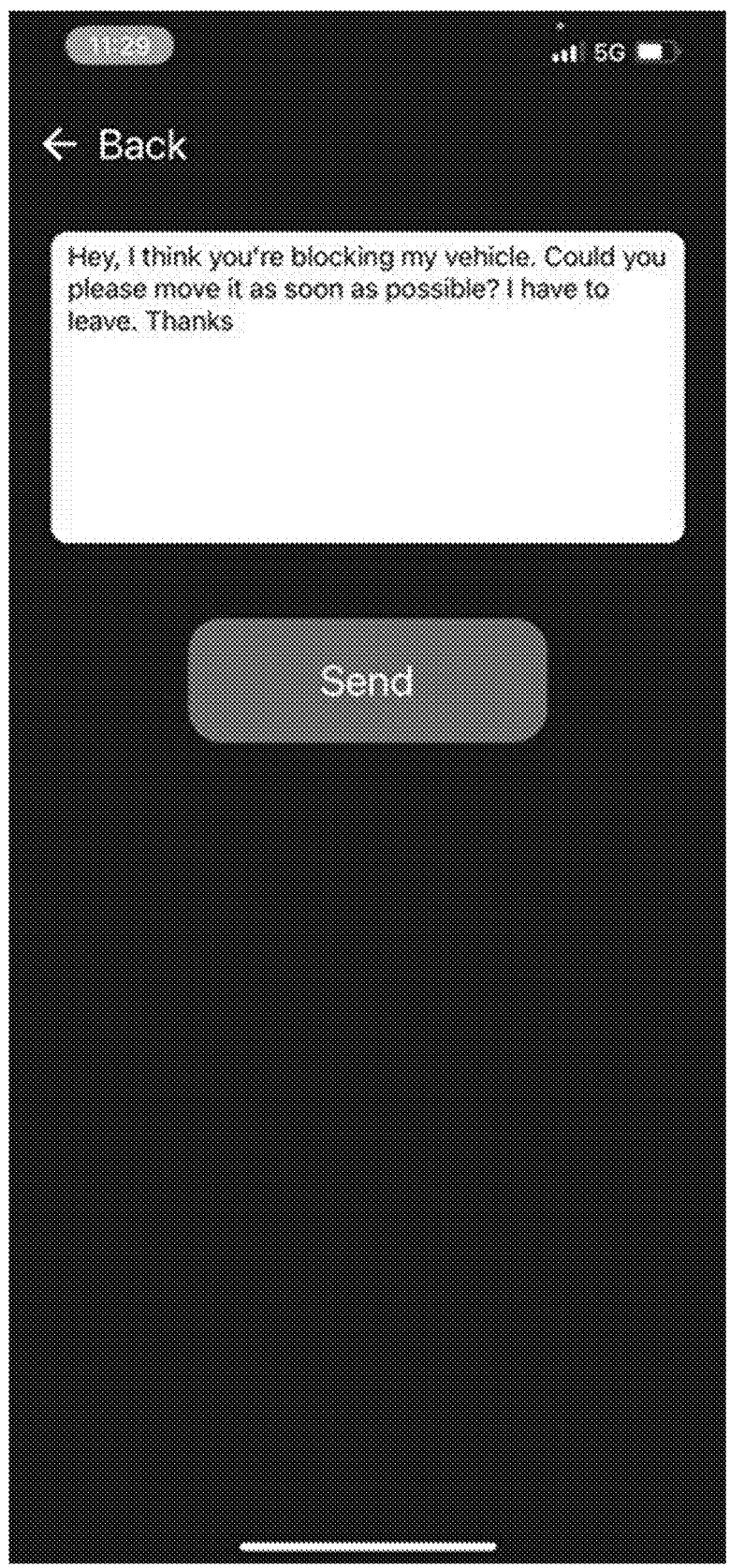
FIG. 42 is a screen shot of a notification screen with custom message of an example mobile device application according to aspects of the present invention.

FIG. 42 is a screen shot of a notification screen with custom message of an example mobile device application. A custom notification can be drafted, edited, and sent from the illustrated screen.

The components, steps, and materials described hereinafter as making up various elements of the disclosed technology are intended to be illustrative and not restrictive. Many suitable components, steps, and materials that would perform the same or similar functions as the components, steps, and materials described herein are intended to be embraced within the scope of the disclosed technology. Such other components, steps, and materials not described herein can include, but are not limited to, similar components or steps that are developed after development of the disclosed technology.

What is claimed is:

1. A computing system comprising:
a first user device comprising non-transitory computer-readable medium configured to communicate with one or more processor(s) of the first user device, the non-transitory computer-readable medium of the first user device including instructions thereon, that when executed by the one or more processor(s) of the first user device, cause the first user device to:
capture a vehicle identification of a vehicle based on a short range identification method between the first user device and the vehicle, wherein the vehicle identification is not associated with the first user device,
receive a user selection, via a user interface of the first user device, of a vehicle condition describing a condition of the vehicle, and
transmit, via a wide-area network, the vehicle identification and a first notification based on the selected vehicle condition;
a second user device distinct from the first user device, the second user device comprising non-transitory computer-readable medium configured to communicate with one or more processor(s) of the second user device, the non-transitory computer-readable medium of the second user device including instructions thereon, that when executed by the one or more processor(s) of the second user device, cause the second user device to:
store the vehicle identification in a second user profile on the second user device such that the first vehicle identification identifies the vehicle as belonging to a user of the second user profile;
associate the second user profile with a closed group of user profiles;
receive, via the wide-area network in real time, the first notification related to the vehicle from the first user device;
determine whether the notification is associated with the closed group; and
restrict communication of information associated with the second user profile to the first user device based at least in part on whether the first notification is associated with the closed group.

2. The computing system of claim 1, wherein the instructions of the second user device, when executed by the one or more processor(s) of the second user device, cause the second user device to:
determine that the first notification is not associated with the closed group; and
receive the first notification without sending, to the first user device, any information related to the first user profile.

3. The computing system of claim 1, the non-transitory computer-readable medium of the second user device further comprising instructions, that when executed by the one or more processor(s) of the second user device, cause the second user device to:
store a plurality of vehicle identifications in the second user profile such that each vehicle identification of the plurality of vehicle identifications identifies a respective vehicle;
receive a vehicle selection, via a user interface of the second user device, indicating a selected vehicle of the plurality of vehicles; and
receive the first notification related to the selected vehicle from the first user device.

4. The computing system of claim 2, wherein the instructions on the non-transitory computer-readable medium of the second user device, when executed by the one or more processor(s) of the second user device, cause the second user device to:
receive a second notification related to the vehicle;
determine that the second notification is associate with the closed group of user profiles;
identify a third user profile associated with the second notification; and
share information related to the second user profile with a third user associated with the third user profile.

5. The computing system of claim 4,
wherein the closed group of user profiles comprises at least one of: profiles registered by a homeowner's association, profiles registered by a corporate vehicle fleet, profiles registered by a police department, or profiles registered by a vehicle safety organization.

6. The computing system of claim 4, the non-transitory computer-readable medium of the second user device further comprising instructions, that when executed by the one or more processor(s) of the second user device, cause the second user device to:
register a temporary user profile with the closed group of user profiles such that the temporary user profile is time-limited and stores a temporary vehicle identification, the temporary user profile being distinct from the second user profile, and the temporary vehicle identification being distinct from the vehicle identification stored in the second user profile.

7. The computing system of claim 4,
wherein the closed group of user profiles is managed by profile management system configured for use by a homeowner's association, a corporate vehicle fleet, a police department, or a vehicle safety organization, and
wherein the second notification is received from the profile management system.

8. The computing system of claim 1, the non-transitory computer-readable medium of the second user device further comprising instructions, that when executed by the one or more processor(s) of the second user device, cause the second user device to:
create a secondary driver user profile being distinct from the second user profile and storing the vehicle identification of the second user profile in the secondary driver user profile.

9. The computing system of claim 1, wherein the first notification indicates an undesirable vehicle condition.

10. The computing system of claim 9, wherein the first notification indicates at least one selection, at the first user device, of a plurality of predetermined undesirable vehicle conditions based at least in part on the indication of occupancy of the vehicle.

11. The computing system of claim 9, wherein the undesirable vehicle condition includes at least one of: headlamp illumination, dome light on, trunk open, window down, door open, gas cap open, tire is flat, hit and run, water is rising, in the way, S.O.S., or fluid leaking.

12. The computing system of claim 1, the non-transitory computer-readable medium of the second user device further comprising instructions, that when executed by the one or more processor(s) of the second user device, cause the second user device to:
provide a user interface configured to allow entry of a second vehicle identification not stored in the second user profile and not associated with the closed group; and
transmit the second vehicle identification and a second notification related to the second vehicle identification without sharing information associated with the second user profile.

13. The computing system of claim 1, the non-transitory computer-readable medium of the second user device further comprising instructions, that when executed by the one or more processor(s) of the second user device, cause the second user device to:
provide a user interface configured to allow entry of a second vehicle identification not stored in the second user profile;
request, from the user interface on the second user device, an indication of occupancy of a second vehicle associated with the second vehicle identification;
provide a plurality of predetermined selections to the user at the user interface on the second user device based at least in part on the indication of occupancy of the second vehicle;
receive one or more of the plurality of predetermined selections from the user at the user interface on the second user device; and
transmit a second notification related to the second vehicle identification based at least in part on the one or more of the plurality of predetermined selections received from the user.

14. The computing system of claim 12, wherein the instructions stored in non-transitory computer-readable medium on the second user device, when executed by the one or more processor(s) of the second user device, are configured to cause the second user device to transmit the second vehicle identification and the second notification without receiving an indication as to an existence of any user profile associated with the second vehicle identification.

15. A computing system comprising:
a first user device comprising non-transitory computer-readable medium configured to communicate with one or more processor(s) of the first user device, the non-transitory computer-readable medium of the first user device including instructions thereon, that when executed by the one or more processor(s) of the first user device, cause the first user device to:
capture a vehicle identification of a vehicle based on a short range identification method between the first user device and the vehicle, wherein the vehicle identification is not associated with a first user profile on the first user device,
receive a user selection of one or more predetermined selections, via a user interface of the first user device, wherein the one or more predetermined selections relate to a vehicle condition describing a condition of the vehicle, and
transmit, via a wide-area network, the vehicle identification, the user selection, and an indication of the first user profile; and
a vehicle condition notification service provider system comprising:
a transmitter;
a receiver;
one or more processor(s) of the vehicle condition notification service provider system; and
non-transitory computer-readable medium with instructions thereon, that when executed by the one or more processor(s) of the vehicle condition notification service provider system, cause the vehicle condition notification service provider system to:

receive a vehicle identification from the first user profile on the first user device, via the receiver, over the wide-area network, identify a second user profile based at least in part on the vehicle identification, wherein the vehicle identification identifies the vehicle as belonging to a user of the second user profile, receive the user selection of the one or more predetermined selections related to vehicle condition from the first user device, via the receiver, determine whether the first user profile and the second user profile are in a common closed group; and transmit a vehicle condition message to a second user device associated with the second user profile, via the transmitter, over the wide-area network in real time, such that communication of information associated with the first user profile to the second user device and the second user profile to the first user device is restricted based at least in part on whether the first user profile and the second user profile in a common closed group, wherein the vehicle condition message is based at least in part on the one or more predetermined selections.

16. The computing system of claim 15, wherein the one or more predetermined selections are based at least in part on vehicle occupancy.

17. The computing system of claim 15, wherein the one or more predetermined selections relate to at least one of: headlamp illumination, dome light on, trunk open, window down, door open, gas cap open, tire is flat, hit and run, water is rising, in the way, S.O.S., or fluid leaking.

18. The computing system of claim 15, wherein the instructions on the non-transitory computer-readable medium of the vehicle condition notification service provider system, when executed by the one or more processor(s) of the vehicle condition notification service provider system, causes the vehicle condition notification service provider system to:

identify one or more closed group(s) associated with the first and second user profile; and determine that the first and second user profiles are not in a common closed group; and transmit the vehicle condition message to one or more profile management system(s) configured to manage the one or more closed group(s) without transmitting information associated with the first user profile to the second user profile, without transmitting information associated with the first user profile to the one or more closed group(s) associated with the second user profile, without providing an indication as to the existence of the second user profile to the first user device, and without providing an indication as to the existence of the second user profile to the closed group(s) associated with the first user device.

\* \* \* \* \*